(12) United States Patent
Hosoi et al.

(10) Patent No.: US 11,887,638 B1
(45) Date of Patent: Jan. 30, 2024

(54) LASER DIODE, THERMALLY ASSISTED MAGNETIC HEAD, HEAD GIMBAL ASSEMBLY, HARD DISK DRIVE AND METHOD OF MANUFACTURING A HEAD GIMBAL ASSEMBLY

(71) Applicant: SAE Magnetics (H.K.) Ltd., Hong Kong (CN)

(72) Inventors: Ryo Hosoi, Hong Kong (CN); Seiichi Takayama, Hong Kong (CN); Kang Gao, Hong Kong (CN); Yasuhiro Konakawa, Hong Kong (CN); Yasutoshi Fujita, Hong Kong (CN); Ryuji Fujii, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 17/980,771

(22) Filed: Nov. 4, 2022

(51) Int. Cl.
*G11B 7/127* (2012.01)
*G11B 5/00* (2006.01)

(52) U.S. Cl.
CPC ...... *G11B 7/127* (2013.01); *G11B 2005/0021* (2013.01)

(58) Field of Classification Search
CPC .................. G11B 7/127; G11B 2005/0021
See application file for complete search history.

(56) References Cited

U.S. PATENT DOCUMENTS

| | | | |
|---|---|---|---|
| 8,248,892 B2 | 8/2012 | Shimazawa et al. | |
| 10,204,655 B1 * | 2/2019 | Ma ....................... | G11B 21/106 |
| 10,269,379 B1 * | 4/2019 | Goggin ................. | G11B 5/012 |
| 10,490,221 B1 * | 11/2019 | Chen ....................... | G11B 13/08 |
| 2011/0205661 A1 | 8/2011 | Komura et al. | |
| 2012/0155232 A1 | 6/2012 | Schreck et al. | |
| 2015/0154988 A1 | 6/2015 | Takei et al. | |
| 2015/0364899 A1 | 12/2015 | Tatah et al. | |
| 2015/0380035 A1 | 12/2015 | Takei et al. | |
| 2018/0330754 A1 * | 11/2018 | Mendonsa ............. | G11B 5/455 |
| 2019/0066719 A1 * | 2/2019 | Macken ............... | G11B 5/3106 |

FOREIGN PATENT DOCUMENTS

| | | |
|---|---|---|
| JE | 2006-128558 | 5/2006 |
| JP | 2002-93092 | 3/2002 |
| JP | 2004-283911 | 10/2004 |
| JP | 2006-221690 | 8/2006 |
| JP | 2007-310968 | 11/2007 |
| JP | 2012-084216 | 4/2012 |

\* cited by examiner

*Primary Examiner* — Andrew Sasinowski
(74) *Attorney, Agent, or Firm* — NIXON & VANDERHYE, P.C.

(57) ABSTRACT

The laser diode includes an electrode pad layer, being connected to an electrode, and an outer surface in which the electrode pad layer is formed. The electrode pad layer includes a solder-bonding pad part and a solder-contact preventing part. The solder-contact preventing part is formed with small wettability material having solder wettability which is smaller than solder wettability of the solder-bonding pad part. The solder-bonding pad part and the solder-contact preventing part are formed so that a pad height, being a height from the outer surface to a surface of the solder-bonding pad part, is larger than a preventing height, being a height from the outer surface to a surface of the solder-contact preventing part.

17 Claims, 42 Drawing Sheets

LASER DIODE, THERMALLY ASSISTED MAGNETIC HEAD, HEAD GIMBAL ASSEMBLY, HARD DISK DRIVE AND METHOD OF MANUFACTURING A HEAD GIMBAL ASSEMBLY

BACKGROUND

Field of the Invention

The present invention relates to a laser diode which is used for a thermally assisted magnetic head recording data on a magnetic recording medium by thermally assisted magnetic recording using near-field light, an optical device such as a laser radar device, the thermally assisted magnetic head, a head gimbal assembly having the thermally assisted magnetic head, a hard disk drive and a method of manufacturing the head gimbal assembly.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, because the recording head is formed on the slider, the structure, which laser light for generating the near-field light is guided to the medium-opposing surface of the slider, is important. The following structure is conventionally known as the structure.

The structure which a light source is provided on the surface of the slider (for example, US2015-0364899 (also called patent document 2), US2011-0205661 (also called patent document 3), US2015-154988 (also called patent document 4), US 2015-0380035 (also called patent document 5), JP2012-084216 (also called patent document 6)).

Concerning the above-described structure, the slider is mounted on a part which is called suspension, thereby a part, including the slider and the suspension, which is called head gimbal assembly (hereinafter, also referred to as "HGA") is manufactured. The magnetic disk drive is fabricated with the HGA.

SUMMARY OF THE INVENTION

There is a following problem in the conventional head gimbal assembly including the above-described thermally assisted magnetic head. Solder is used in the process of manufacturing the HGA, thereby the problem is caused.

When a laser diode as the light source is provided on the surface of the slider, a member which is called sub-mount is used. For example, the sub-mount 300, as illustrated in FIG. 36, is used.

At this time, a laser diode 310 is joined on a surface 300a of the sub-mount 300 to form a light source-unit 360. After that, the sub-mount 300 is joined on a surface 401 of a slider 400. Thereby a thermally assisted magnetic head 402 is manufactured.

Then, as illustrated in FIG. 37, when the slider 400 is mounted on a suspension 500, a HGA 700 is manufactured with them, a terminal pad 410 of the slider 400 is electrically connected to the suspension 500. Further, because an electrode 311 is formed on a surface of the laser diode 310, the electrode 311 is also electrically connected to the suspension 500. The terminal pad 410 of the slider 400, the electrode 311 of the laser diode 310 are conventionally connected with solder (respectively solders 600, 610).

Concerning the conventionally HGA, the structure, which electrodes, of the slider and the laser diode, are connected to the suspension with solder, like the HGA 700, for example, is disclosed in JP2004-283911 (also called patent document 7), JP2007-310968 (also called patent document 8), JP2002-93092 (also called patent document 9), JP2006-221690 (also called patent document 10), U.S. Pat. No. 8,248,892 (also called patent document 11) and so on.

As described above, when the HGA 700 is manufactured, the solder 610 needs to be connected to both the laser diode 310 and the suspension 500. The solder 600 also needs to be connected both the slider 400 and the suspension 500.

However, the laser diode 310 has extremely small size as compared with the slider 400 and the suspension 500. Therefore, as illustrated in FIG. 38, FIG. 39, an outer surface 312 of the laser diode 310 (an outside surface, opposing to a bottom surface 307 of the laser diode 310, the surface is used for a connection to the suspension 500) has extremely small size as compared with the slider 400 and the suspension 500.

Moreover, the outer surface 312 includes a mark, having a line like shape, which is called a junction-line 313 being formed so as to clarify a position of an emitting part of laser light. The solder 610 has to be connected to a part, of the outer surface 312, except for the junction-line 313. Therefore, a part, which the solder 610 is able to effectively touch, is limited in an extremely small area, in the laser diode 310.

Then as illustrated in FIG. 40, an electrode 311 is formed on the outer surface 312, the solder 610 is connected with the electrode 311 (except for the junction-line 313) and a connection pad 501 of the suspension 500. When the solder 610 is attached to the electrode 311 and the connection pad 501, the solder 610 is in melting condition. The solder 610 hardens after being attached to the electrode 311 and the connection pad 501.

However, when the solder 610 is attached to the electrode 311 and the connection pad 501, the solder 610 sometimes becomes a solder 610A, illustrated in FIG. 41(*a*), FIG. 42(*a*). The solder 610A includes an overflow part 611, flowed over a side surface 314 of the laser diode 310. Besides, the solder 610 sometimes becomes a solder 610B, illustrated in FIG. 41(*b*), FIG. 42(*b*). The solder 610B includes an overflow part 612, flowed over the junction-line 313.

When the overflow part 611 is formed, the overflow part 611 is linked to an active layer, thereby a short circuit is likely to occur in the laser diode 310. Besides, when the overflow part 612 is formed, performance and reliability of the laser diode 310 is likely to be lowered.

Namely, the conventional laser diode 310, the thermally assisted magnetic head 402 and the HGA 700 respectively include the following A), B). Therefore, they respectively include subject which the short circuit, by a bonding of the solder 610, is likely to occur, and performance and reliability of the laser diode 310 is likely to be lowered.

A) a part, which the solder 610 is able to effectively touch, is limited in an extremely small area, in the laser diode 310.

B) the solder 610 is connected in melting condition.

Hence the present invention is made to solve the above problem, and it is an object to prevent an occurrence of the short circuit, lowering of performance and reliability by solder bonding in the laser diode, by forming a structure which solder is able to be surely connected with a predetermined position of the laser diode, in the laser diode, which is used for the thermally assisted magnetic head, the optical device, the thermally assisted magnetic head, the head gimbal assembly and the hard disk drive having the laser diode, and a method of manufacturing the head gimbal assembly.

To solve the above problem, the present invention is a laser diode including: an electrode pad layer, being connected to an electrode; and an outer surface in which the electrode pad layer is formed; the electrode pad layer includes a solder-bonding pad part, which is formed inside of a peripheral end part of the outer surface and a solder-contact preventing part, which is formed between the solder-bonding pad part and the peripheral end part; the solder-contact preventing part is formed with small wettability material having solder wettability which is smaller than solder wettability of the solder-bonding pad part; the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part.

It is possible that the laser diode constitutes a thermally assisted magnetic head with a slider in which an electromagnetic element is formed.

In case of the above-described laser diode, it is possible that the solder-contact preventing part includes an outer preventing part, being formed between the solder-bonding pad part and the peripheral end part and an inner preventing part, being formed inside of the solder-bonding pad part; the outer preventing part and the inner preventing part are formed so that the outer preventing part and the inner preventing part opposes to each other by sandwiching the solder-bonding pad part, and a width and length of the outer preventing part matches a width and length of the inner preventing part.

Further, in the above-described, laser diode it is preferable that the solder-contact preventing part includes a linking preventing part which connects the outer preventing part; and the inner preventing part; the linking preventing part is formed between the solder-bonding pad part and the peripheral end part.

Furthermore, in the above-described laser diode, it is preferable that the solder-bonding pad part has a thickness which is larger than the thickness of the outer preventing part, the inner preventing part and the linking preventing part.

In the above-described it is possible that a first metal layer which is directly formed on the outer surface; the first metal layer is formed with large wettability material having solder wettability which is larger than solder wettability of the solder-contact preventing part; both the solder-bonding pad part and the solder-contact preventing part are formed on the first metal layer.

It is preferable that the laser diode further including: a second metal layer which is formed directly on the surface of the first metal layer; and a third metal layer which is formed directly on the surface of the second metal layer; the second metal layer and the third metal layer are formed with large wettability material having solder wettability which is larger than solder wettability of the solder-contact preventing part; the solder-bonding pad part is formed with a part of the third metal layer, being formed on the second metal layer, and the solder-contact preventing part is formed on the second metal layer, in approximately U-figure shape in a plan view, so as to surround the solder-bonding pad part.

Further, it is preferable that the outer preventing part and the inner preventing part have widths being equal to or larger than the width of the solder-bonding pad part.

Further this invention provides a thermally assisted magnetic head, including: a slider in which an electromagnetic element is formed, and a light-source unit, which is joined to the slider; the light-source unit includes a sub-mount, and a laser diode, which is joined to the sub-mount; the laser diode includes an electrode pad layer, being connected to an electrode; and an outer surface in which the electrode pad layer is formed; the electrode pad layer includes a solder-bonding pad part, which is formed inside of a peripheral end part of the outer surface; and a solder-contact preventing part, which is formed between the solder-bonding pad part and the peripheral end part; the solder-contact preventing part is formed with small wettability material having solder wettability which is smaller than solder wettability of the solder-bonding pad part; the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part.

In the above-described thermally assisted magnetic head, it is preferable that the solder-contact preventing part includes an outer preventing part, being formed between the solder-bonding pad part and the peripheral end part and; an inner preventing part, being formed inside of the solder-bonding pad part; the outer preventing part and the inner preventing part are formed so that the outer preventing part and the inner preventing part opposes to each other by sandwiching the solder-bonding pad part, and a width and length of the outer preventing part matches a width and length of the inner preventing part.

Then, the present invention provides a head gimbal assembly, including: a thermally assisted magnetic head, and a suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head gimbal assembly includes an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure; the laser diode includes an electrode pad layer, being connected to an electrode; and an outer surface in which the electrode pad layer is formed; the electrode pad layer includes a solder-bonding pad part, which is formed inside of a peripheral end part of the outer surface; and a solder-contact preventing part, which is formed between the solder-bonding pad part and the peripheral end part; the solder-contact preventing part is formed with small wettability material having solder wettability which is smaller than solder wettability of the solder-bonding pad part; the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part; the solder connector touches with the solder-bonding pad part without touching with the solder-contact preventing part, thereby the solder connector is connected with the laser diode.

In the above-described head gimbal assembly, it is possible that the head gimbal assembly further including: a connection part; the connection part includes a part, of the solder connector, which is connected to the laser diode; the connection part remains inside the solder-bonding pad part.

In the above-described head gimbal assembly, it is possible that the solder-contact preventing part includes an outer preventing part, being formed between the solder-bonding pad part and the peripheral end part; and an inner preventing part, being formed inside of the solder-bonding pad part; the outer preventing part and the inner preventing part are formed so that the outer preventing part and the inner preventing part opposes to each other by sandwiching the solder-bonding pad part, and a width and length of the outer preventing part matches a width and length of the inner preventing part.

In the above-described head gimbal assembly, it is possible that the suspension includes a load beam including the light-source unit surface; the flexure includes a wiring member which forms the slider arrangement surface; the wiring member includes an exposed wiring surface which is exposed in the opening part; the solder connector is connected to the exposed wiring surface of the wiring member.

Further, the present invention provides a hard disk drive including: a head gimbal assembly; and a magnetic recording medium; the head gimbal assembly includes a thermally assisted magnetic head and a suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the head gimbal assembly includes an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure; the laser diode includes an electrode pad layer, being connected to an electrode; and an outer surface in which the electrode pad layer is formed; the electrode pad layer includes a solder-bonding pad part, which is formed inside of a peripheral end part of the outer surface; and a solder-contact preventing part, which is formed between the solder-bonding pad part and the peripheral end part; the solder-contact preventing part is formed with small wettability material having solder wettability which is smaller than solder wettability of the solder-bonding pad part; the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part; the solder connector touches with the solder-bonding pad part without touching with the solder-contact preventing part, thereby the solder connector is connected with the laser diode.

Further, the present invention provides a method of manufacturing a head gimbal assembly having a thermally assisted magnetic head and a suspension including: head connecting step which the thermally assisted magnetic head is connected to the suspension; the thermally assisted magnetic head includes a structure which a light-source unit, having a laser diode, is joined to a slider in which an electromagnetic element is formed; the suspension includes an opening part which penetrates from a slider arrangement surface, which the slider is arranged, to a light-source unit surface, which the light-source unit is arranged, and a flexure which forms the slider arrangement surface; the laser diode includes an electrode pad layer, being connected to an electrode; and an outer surface in which the electrode pad layer is formed; the electrode pad layer includes a solder-bonding pad part, which is formed inside of a peripheral end part of the outer surface and; a solder-contact preventing part, which is formed between the solder-bonding pad part and the peripheral end part; the solder-contact preventing part is formed with small wettability material having solder wettability which is smaller than solder wettability of the solder-bonding pad part; the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part; the head connecting step includes a solder ball arrangement step which a solder ball is arranged so that the laser diode is connected to the flexure, in an assembly structure which the light-source unit is inserted into the opening part from the slider arrangement surface of the suspension and the light-source unit is protruded from the light-source unit surface and the slider is adhered to the slider arrangement surface of the suspension; the solder ball arrangement step is performed so that the solder ball touches with the solder-bonding pad part without touching with the solder-contact preventing part, thereby the solder ball is connected with the laser diode.

In the above-described the method of manufacturing a head gimbal assembly head gimbal assembly, it is possible that the solder ball arrangement step is performed using a connecting ball in unmelted-solid condition as the solder ball, the solder ball arrangement step is performed with positioning of the connecting ball so that a part of the connecting ball touches with the solder-bonding pad part.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of a Head Gimbal Assembly)

Figure 1:
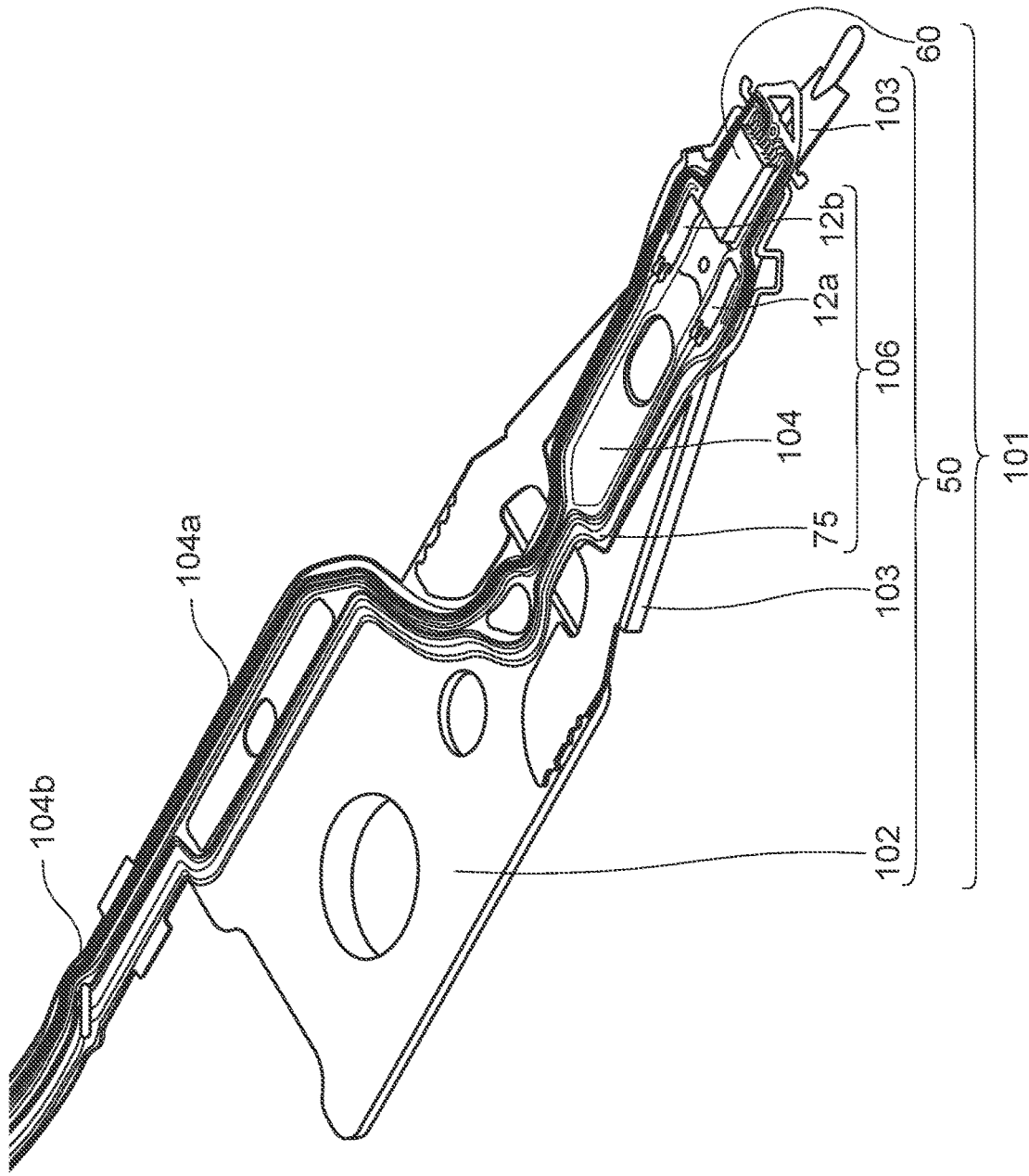
FIG. 1 is a perspective view of a whole HGA, seen from front side, according to an embodiment of the present invention.
Figure 2:
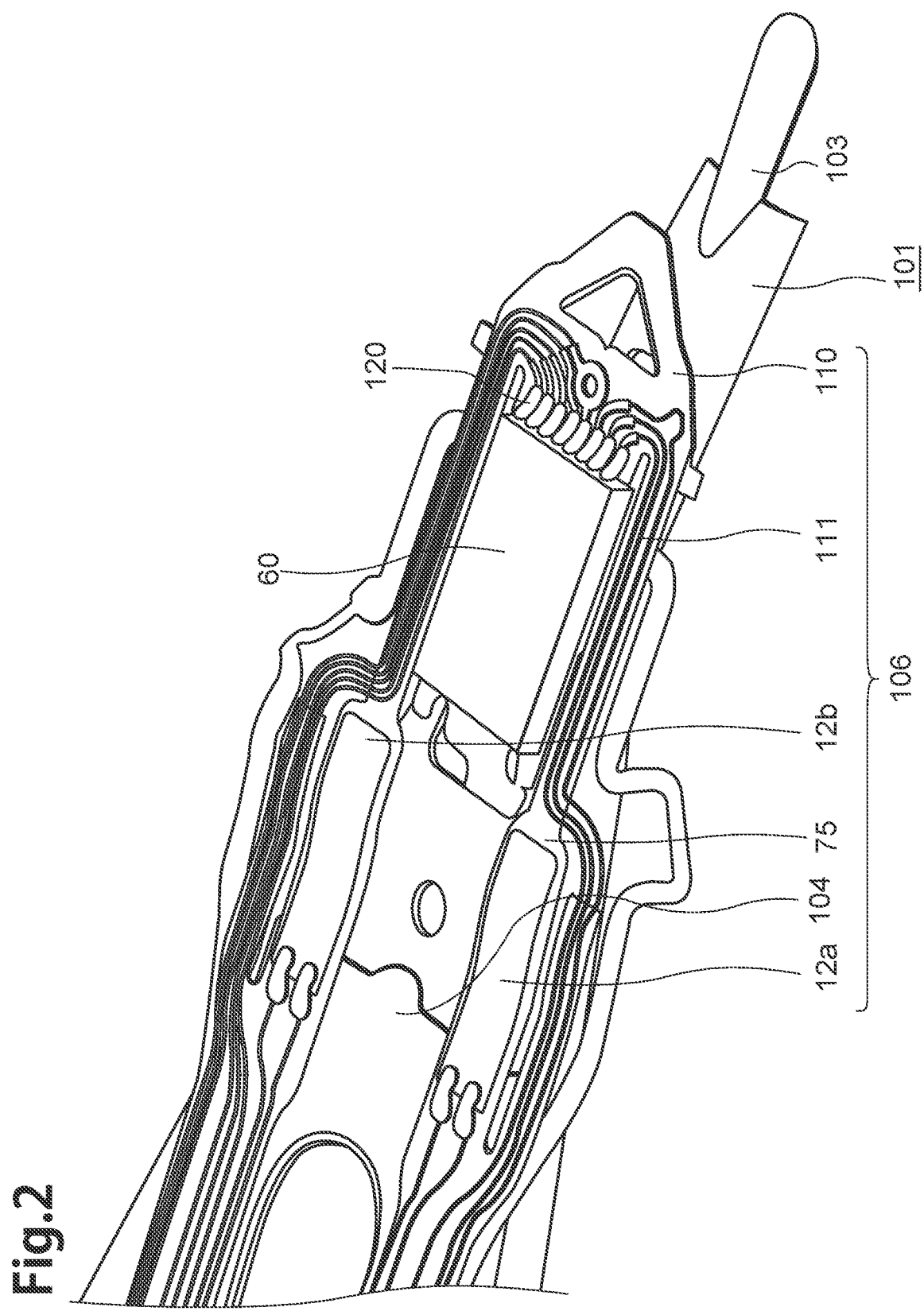
FIG. 2 is a perspective view, seen from the front side, of a principal part of the HGA, in FIG. 1.
Figure 3:
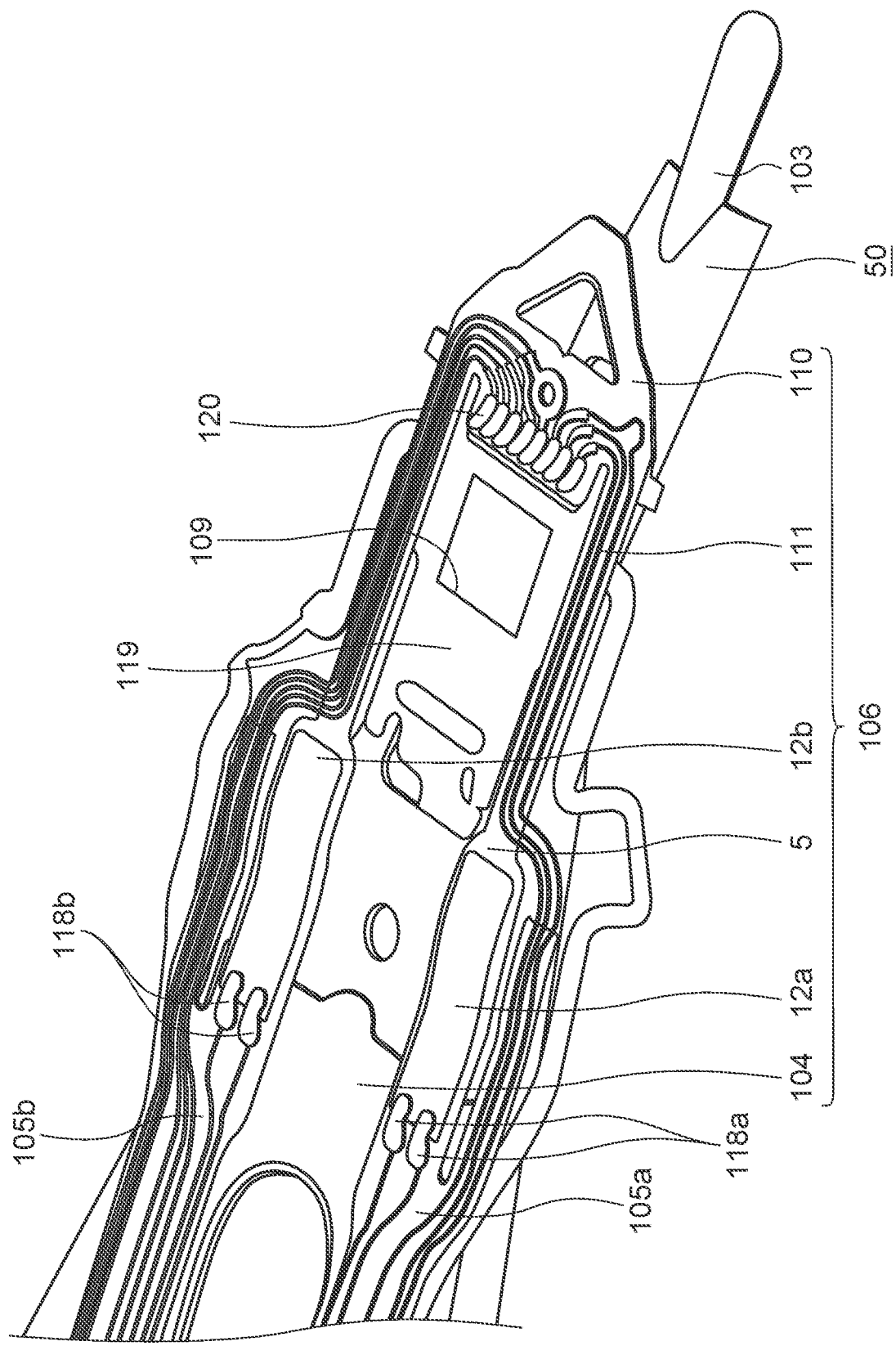
FIG. 3 is a perspective view, seen from the front side, of the principal part of a suspension constituting the HGA, in FIG. 1.
Figure 4:
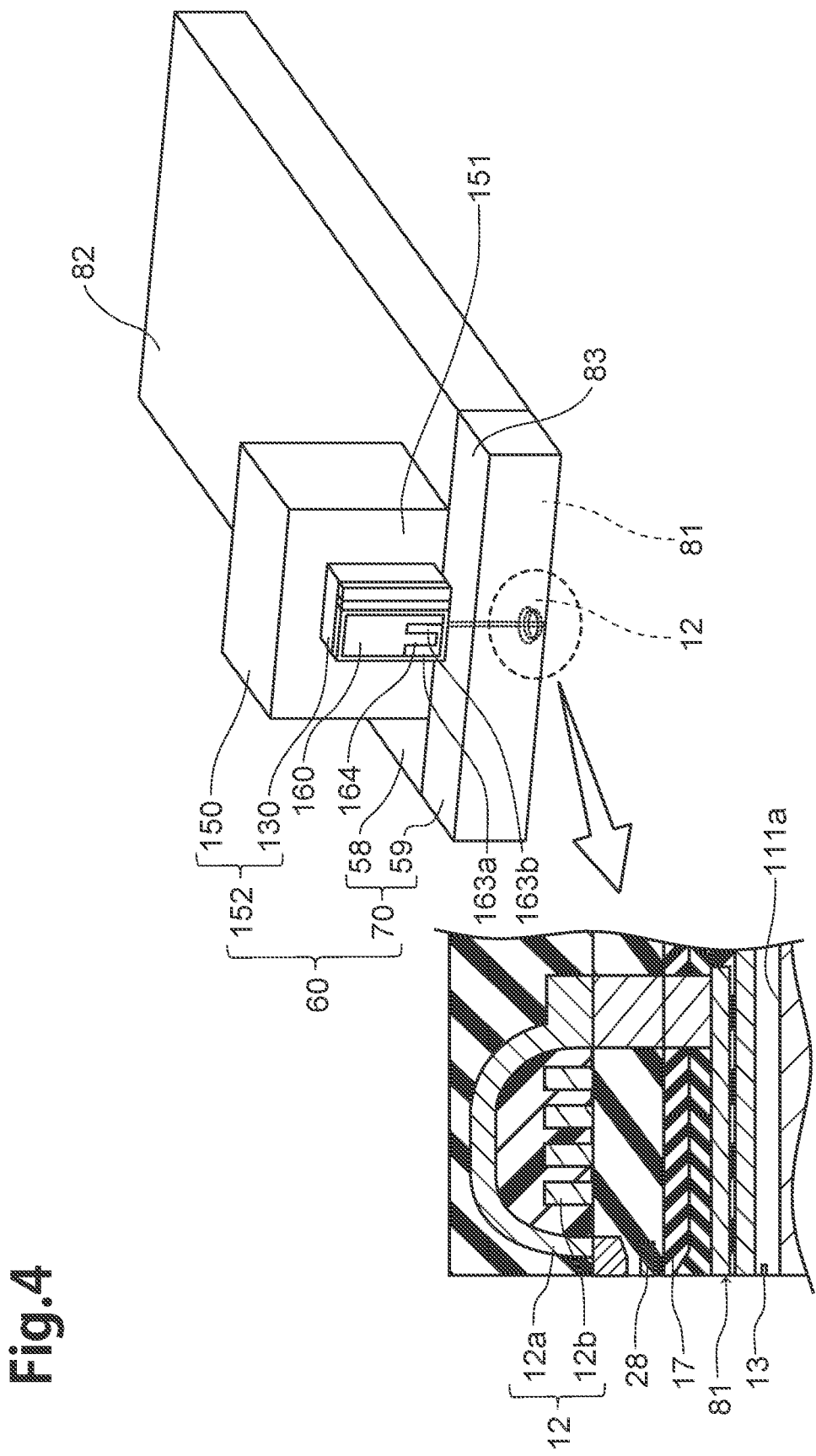
FIG. 4 is a perspective view of the thermally assisted magnetic head constituting the HGA, in FIG. 1.
Figure 5:
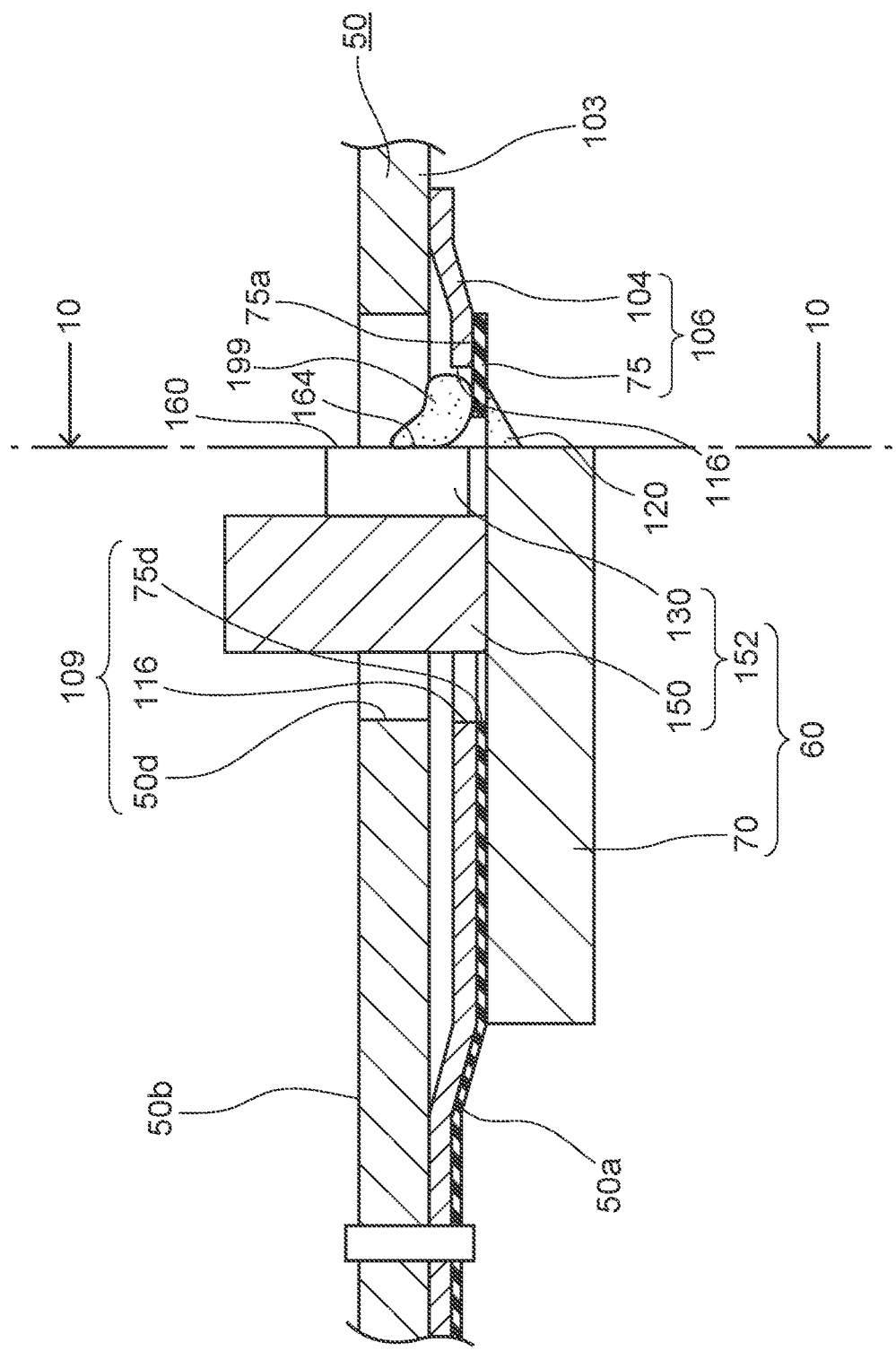
FIG. 5 is a sectional view of a principal part, of the HGA in FIG. 1, which is along with the length direction.
Figure 6:
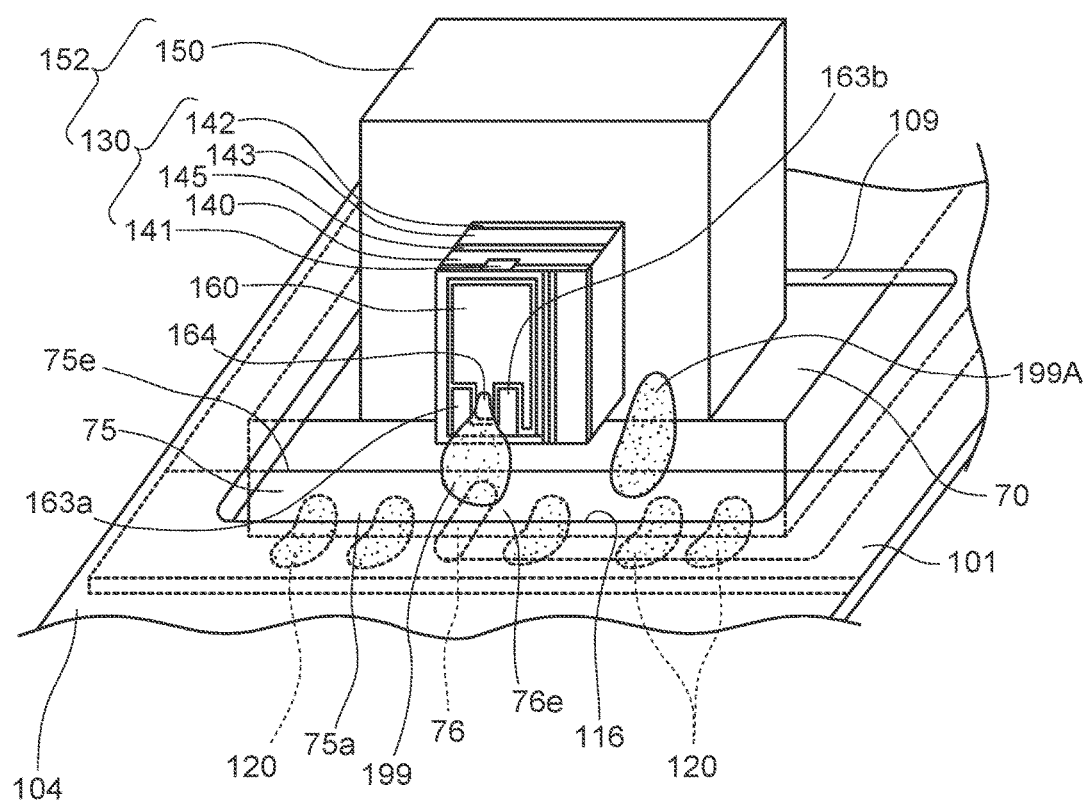
FIG. 6 is a perspective view, seen from the rear side, showing the principal part of the HGA in FIG. 1.
Figure 7:
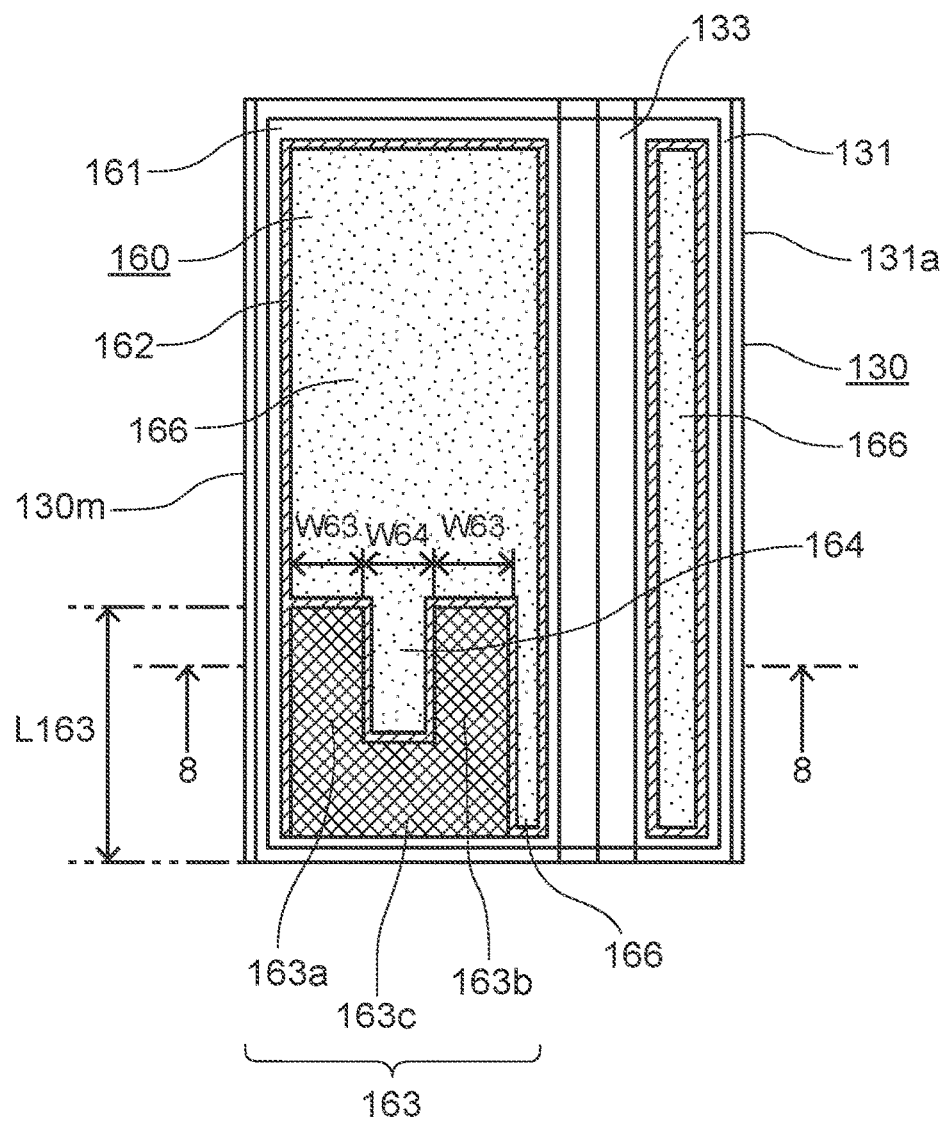
FIG. 7 is a plan view showing a laser diode which is included in the HGA in FIG. 1.
Figure 8:
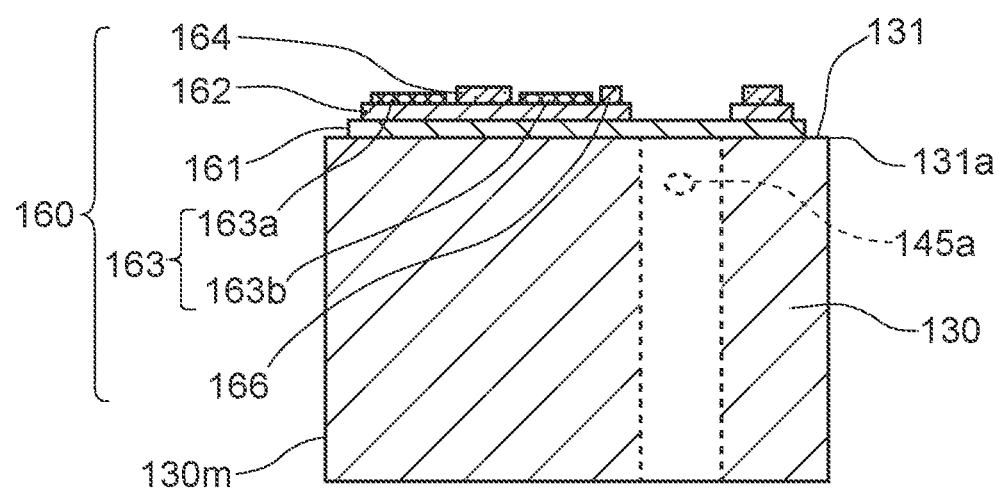
FIG. 8 is a sectional view, taken along the line 8-8 in FIG. 7.
Figure 9:
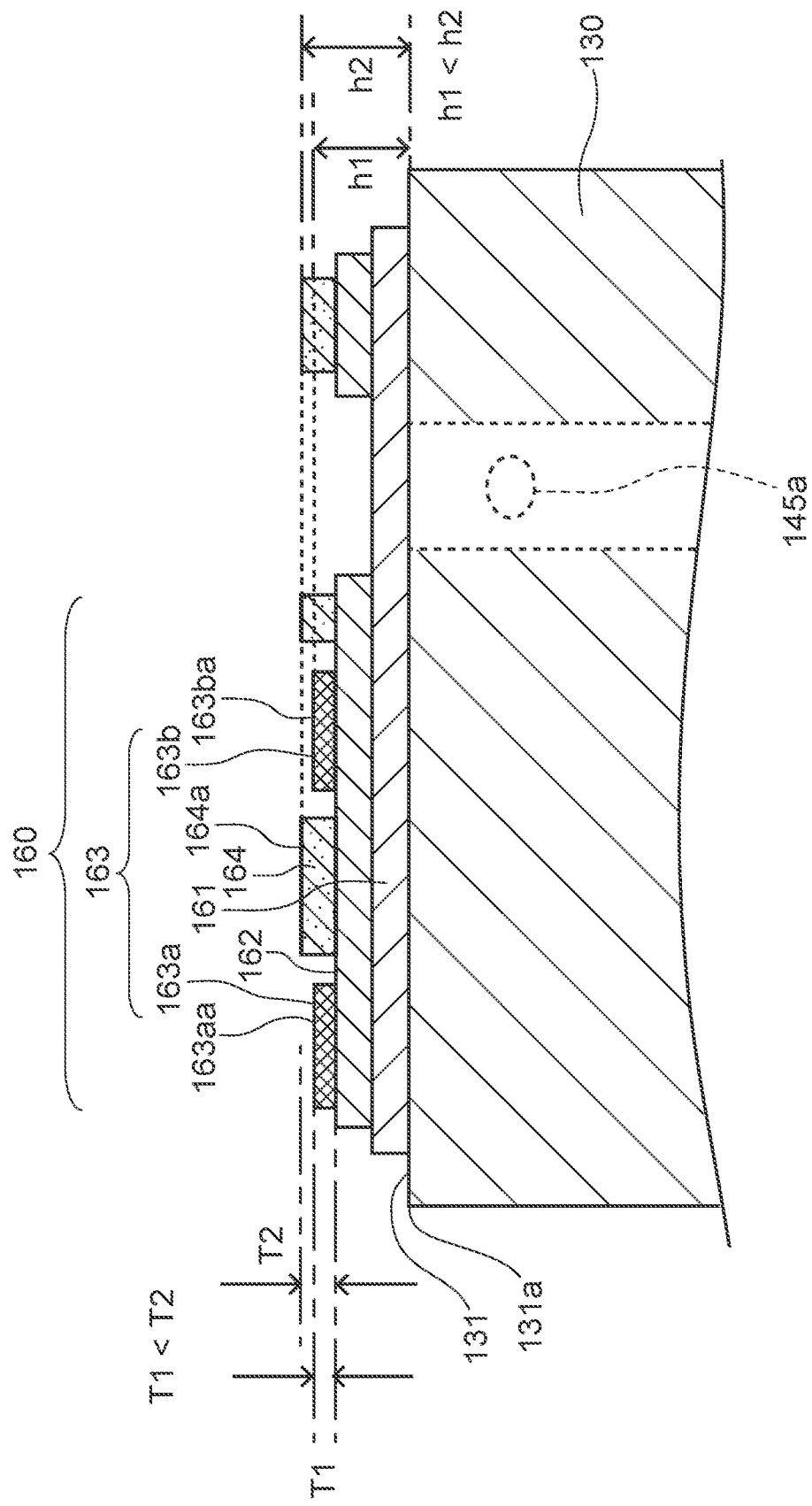
FIG. 9 is a sectional view, with enlargement, of the principal part in FIG. 8.
Figure 10:
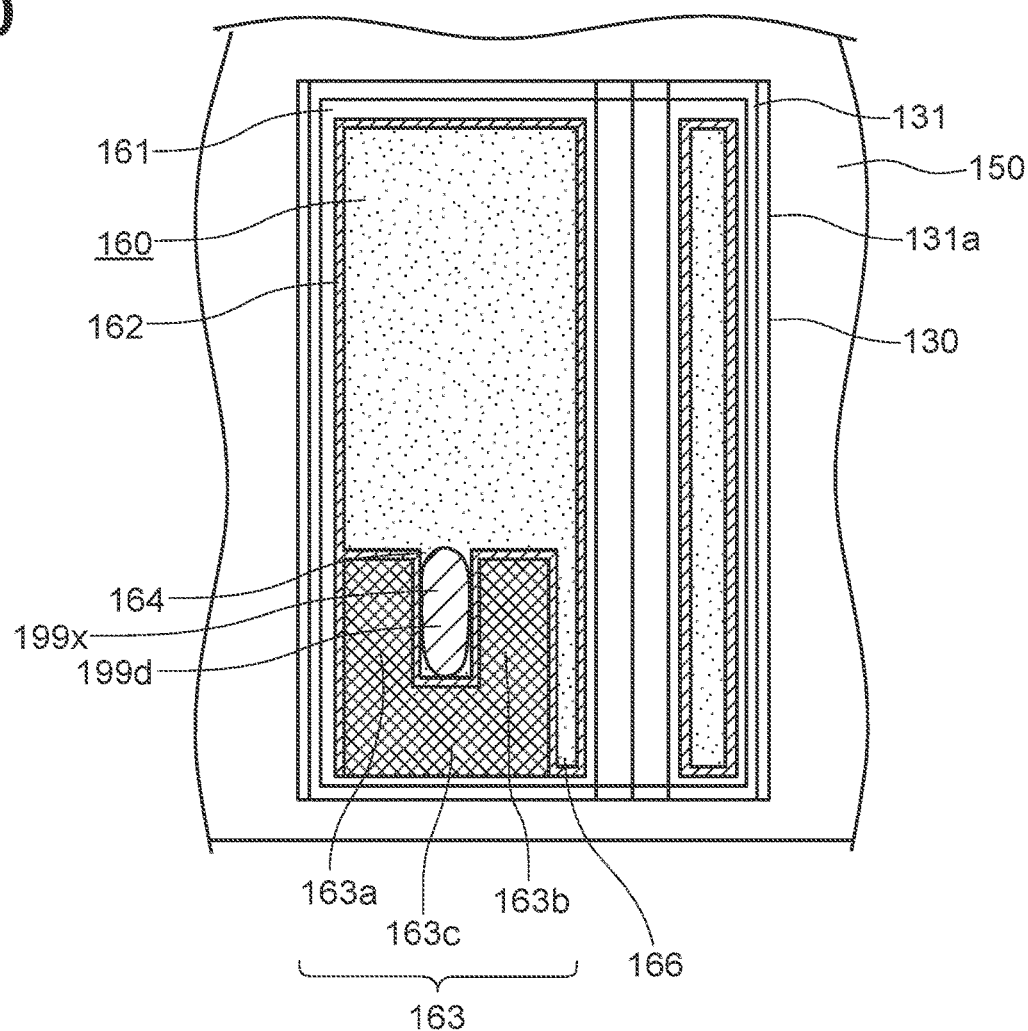
FIG. 10 is a sectional view, partly omitted, taken along the line 10-10 in FIG. 5.
Figure 11:
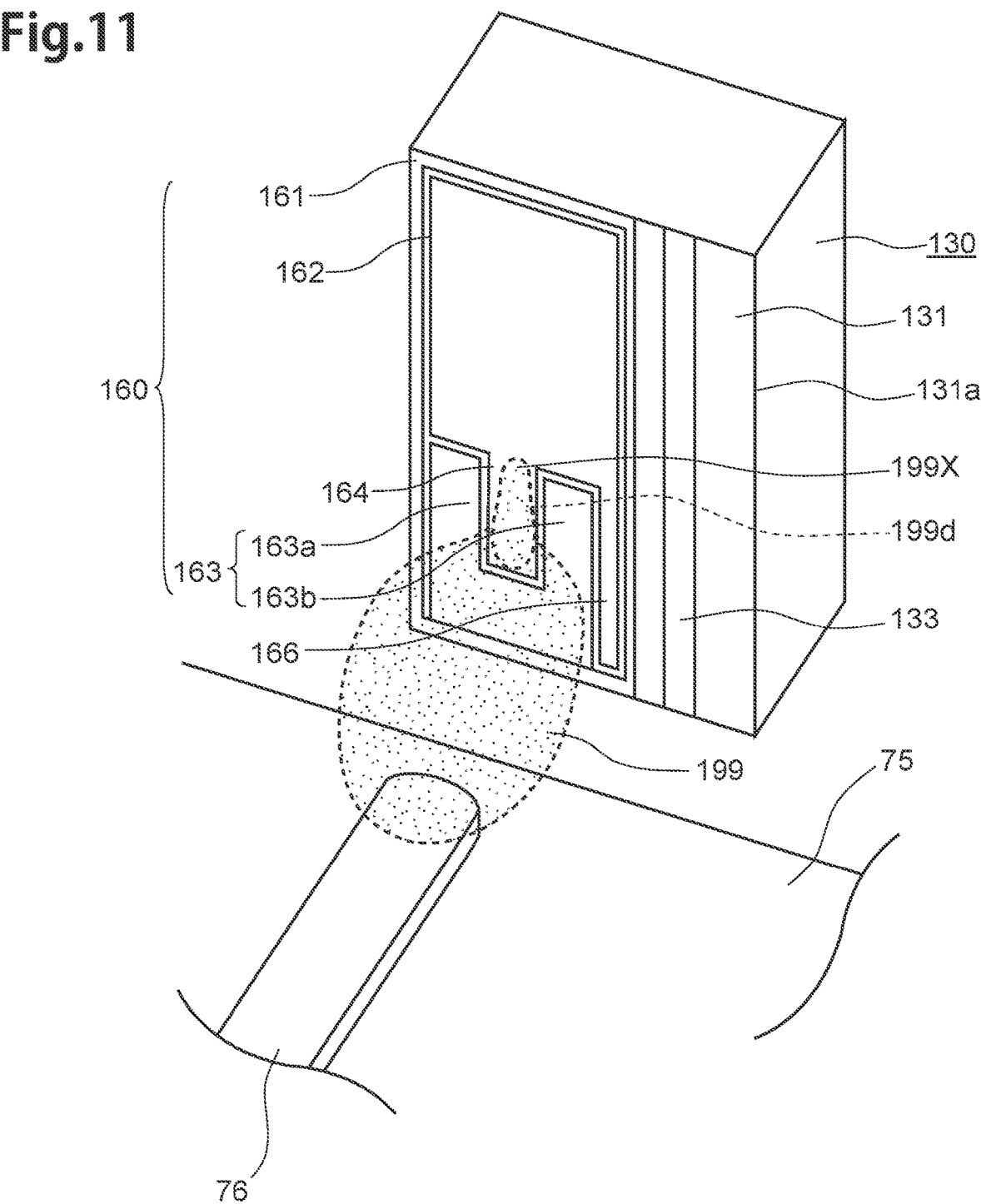
FIG. 11 is a perspective view of a principal part in FIG. 6.

To begin with, structure of a Head Gimbal Assembly 101, according to the embodiment of the present invention, will be explained with reference to FIG. 1 to FIG. 11. Here, FIG. 1 to FIG. 6 are views showing the HGA 101, according to the embodiment of the present invention, FIG. 1 is a perspective view of the whole HGA 101, seen from the front side, FIG. 2 is a perspective view, seen from the front side, of a principal part of the HGA 101, FIG. 3 is a perspective view, seen from the front side, of a principal part of a suspension 50 constituting the HGA 101. Further, FIG. 4 is a perspective view of a thermally assisted magnetic head 60 constituting the HGA 101, FIG. 5 is a sectional view of a principal part, of the HGA 101, which is along with the length direction, FIG. 6 is a perspective view, seen from the rear side, showing the principal part of the HGA 101. Further, FIG. 7 is a plan view showing a laser diode 130 which is included in the HGA 101, FIG. 8 is a sectional view, taken along the line 8-8 in FIG. 7. FIG. 9 is a sectional view, with enlargement, of the principal part in FIG. 8. FIG. 10 is a sectional view, partly omitted, taken along the line 10-10 in FIG. 5. FIG. 11 is a perspective view of a principal part in FIG. 6.

As illustrated in FIG. 1, the HGA 101 has the suspension 50 and the thermally assisted magnetic head 60. The suspension 50 has a base plate 102, a load beam 103, a flexure 106 and a dumper not illustrated, and it has a structure which these parts are joined to be united one body by a weld and so on.

The base plate 102 is a part which is used to fix the suspension 50 to drive arms 209 of a later-described hard disk drive 201, and it is formed with a metal such as stainless steel or the like.

The load beam 103 is fixed on the base plate 102. The load beam 103 has a shape in which the width gradually decreases as it is distanced more from the base plate 102. The load beam 103 has a load bending part which generates a power for pressing the thermally assisted magnetic head 60 against the hard disk 202 of the hard disk drive 201.

Further, as illustrated in FIG. 2, the flexure 106 has a flexure substrate 104, a wiring member 75, a connecting wiring 111 and thin-film piezoelectric material elements 12a, 12b. The flexure 106 has a structure which the wiring member 75 is formed on the flexure substrate 104, the connecting wiring 111 and thin-film piezoelectric material elements 12a, 12b are adhered on the wiring member 75. Further, a not-illustrated protective insulating layer is formed so as to cover the connecting wiring 111 and thin-film piezoelectric material elements 12a, 12b.

The flexure 106 has piezoelectric elements attached structure which thin-film piezoelectric material elements 12a, 12b are fixed on the surface of the wiring member 75 in addition to the connecting wiring 111 to become a structure with piezoelectric element.

Further, the flexure 106 has a gimbal part 110 on the tip side (load beam 103 side). A tongue part 119, which the thermally assisted magnetic head 60 is mounted, is secured on the gimbal part 110 (see FIG. 3), and a plurality of connecting pads 120 are formed near an edge side than the tongue part 119. Connecting pads 120 are electrically connected to not-illustrated electrode pads of the thermally assisted magnetic head 60, and the connecting pads 120 are formed with solder.

This flexure 106 expands or shrinks thin-film piezoelectric material elements 12a, 12b and expands or shrinks stainless part (referred to out trigger part) jut out outside of the tongue part 119. That makes a position of the thermally assisted magnetic head 60 move very slightly around not-illustrated dimple, and a position of the thermally assisted magnetic head 60 is controlled minutely.

The flexure substrate 104 is a substrate for supporting a whole of the flexure 106, and it is formed with stainless. Rear side of the flexure substrate 104 is fixed to the base plate 102 and the load beam 103 by weld (see FIG. 5, concerning the load beam 103). As illustrated in FIG. 1, the flexure substrate 104 has a center part 104a fixed to surfaces of the load beam 103 and the base plate 102, and a wiring part 104b extending to outside from the base plate 102.

As illustrated in FIG. 5, the wiring member 75 covers surface of the flexure substrate 104. The wiring member 75 forms a later-described slider arrangement surface 50a, of the HGA 101, according to this invention. The wiring member 75 is formed with for example polyimide, and it has a thickness of about 5 μm to 10 μm. Further, as illustrated in detail in FIG. 3, a part of the wiring member 75, disposed on the load beam 103, is divided two parts. One part of them is a first wiring part 105a, the other part of them is a second wiring part 105b. The thin-film piezoelectric material elements 12a and thin-film piezoelectric material element 12b are adhered on surfaces of each wiring part. The thin-film piezoelectric material element 12a, 12b are connected to the electrode pads 118a, 118b. The electrode pads 118a, 118b are connected to the connecting wiring 111.

Further, as illustrated in FIG. 5, FIG. 6, the wiring member 75 has an exposed wiring surface 75a which is exposed inside a later-described opening part 109. An electrode wiring 76, included in the connecting wiring 111, is provided on the exposed wiring surface 75a. A connecting pad 76e of an electrode wiring 76 is connected with a later-described solder connector 199. Further a plurality of connecting pads 120 are formed on the slider arrangement surface 50a of the wiring member 75. The connecting pads 120 are connected to the connecting wiring 111.

As illustrated in FIG. 3, a plurality of connecting wirings 111 are formed on surfaces of each of the first wiring part 105a and the second wiring part 105b. Each connecting wiring 111 is formed with conductor such as copper or the like. One end parts of each connecting wiring 111 are connected to the electrode pads 118a, 118b or each connecting pad 120. The electrode wiring 76 of the connecting wiring 111 is connected to the solder connector 199.

Then, illustrated in FIG. 5, the suspension 50 includes the slider arrangement surface 50a and a light-source unit surface 50b. The slider arrangement surface 50a is a surface of the side which a later-described slider 70, of the thermally assisted magnetic head 60, is arranged. The slider arrangement surface 50a is formed with an outside surface of the above-described wiring member 75. The slider 70 is adhered on the slider arrangement surface 50a.

Further, the suspension 50 includes the opening part 109. The opening part 109 is a hole part which penetrates from the slider arrangement surface 50a to the light-source unit surface 50b, and it is formed by overlapping of an opening part 75d, an opening part 116, opening part 50d. The opening part 75d, the opening part 116, the opening part 50d are respectively the opening part of the wiring member 75, the opening part of the flexure substrate 104, the opening part of the load beam 103 (note that the load beam 103 is omitted in FIG. 6, for convenience of illustration).

Then, the HGA 101 includes an assembly structure. As illustrated in FIG. 5, FIG. 6, the assembly structure is a structure which is constituted by the suspension 50 and the thermally assisted magnetic head 60.

As later described in detail, the thermally assisted magnetic head 60 includes the slider 70 and a light source-unit 152. In the HGA 101, concerning the suspension 50 and the thermally assisted magnetic head 60, the light source-unit 152 is inserted in the opening part 109 from the slider arrangement surface 50a and the light source-unit 152 is protruded from the light-source unit surface 50b. Moreover, the slider 70 is adhered on the slider arrangement surface 50a of the suspension 50. The structure, which is constituted by the suspension 50 and the thermally assisted magnetic head 60, is the assembly structure.

Further, the HGA 101 includes the solder connector 199. The solder connector 199 is formed with solder. As illustrated in FIG. 5, FIG. 6, FIG. 11, the solder connector 199 is formed so that the laser diode 130 is connected with the wiring member 75 of the flexure 106. An electrode wiring 76 is formed on the wiring member 75, the solder connector 199 is connected with the electrode wiring 76.

Further, the solder connector 199 is connected with the laser diode 130 by contact with a later-described solder-bonding pad part 164. The solder connector 199 does not touch with the other part, of the laser diode 130, including a later-described solder-contact preventing part 163. The solder connector 199 touches with the only solder-bonding pad part 164 for the laser diode 130.

As illustrated in FIG. 6, FIG. 10, FIG. 11, the laser diode 130 includes a later-described electrode pad layer 160. The electrode pad layer 160 is formed on an outer surface 131.

Here, the case, which the HGA 101 is cut along with a surface of the electrode pad layer 160 (along with the line 10-10 in FIG. 5) in a position being extremely away from the electrode pad layer 160, is supposed. Then, because the solder connector 199 is connected with the laser diode 130, the solder connector 199 is also cut along with the surface of the electrode pad layer 160. As illustrated in FIG. 10, a sectional surface 199d of the solder connector 199 appears in the sectional surface. The sectional surface 199d fits in inside the solder-bonding pad part 164. Because the solder connector 199 is in contact with the only solder-bonding pad part 164 for the laser diode 130.

Further, a part, from the surface of the solder-bonding pad part 164 to the sectional surface 199d, of the solder connector 199 corresponds to a connection part 199X. In FIG. 10, FIG. 11, a part having an approximately elliptic shape, which is formed in the solder-bonding pad part 164, corresponds to the sectional surface 199d and the connection part 199X. The connection part 199X includes a part which directly touch with the solder-bonding pad part 164. The connection part 199X fits in inside the solder-bonding pad part 164 without extending outside the solder-bonding pad part 164.

(Structure of the thermally assisted magnetic head) As illustrated in FIG. 4, the thermally assisted magnetic head 60 has a slider 70 and a light source-unit 152. The thermally assisted magnetic head 60 has a structure which a sub-mount 150 of the light source-unit 152 is joined to the slider 70.

The slider 70 has a slider-substrate 58 and a magnetic head part 59 formed on the slider-substrate 58.

The slider-substrate 58 is made of a ceramic material such as aluminum oxide-titanium carbide ($Al_2O_3 \cdot TiC$) or the like, and it is formed in a rectangular parallelepiped shape. The slider-substrate 58 has a medium opposing surface (Air Bearing Surface, which will hereinafter be referred also to as "ABS") 81 opposing to the magnetic recording medium, a light source placing surface 82, arranged in the rear side of the ABS 81. A part, of the light source placing surface 82, near the magnetic head part 59, is a light source-opposing surface 83. The light source-opposing surface 83 opposes to a later-described laser diode 130 of the light source-unit 152.

The magnetic head part 59 has an electromagnetic coil element 12 which is a recording head for recording magnetic data and a MR device 13 which is a reproducing head for detecting a magnetic signal. The magnetic head part 59 has a structure which the reproducing head and the recording head are stacked. Further, the magnetic head part 59 has a core layer 17 and a near-field light generating layer 28.

The MR device 13 is constituted by a magnetosensitive film exhibiting a magnetoresistive effect, such as AMR (anisotropic magnetoresistive), GMR (giant magnetoresistive), and TMR (tunneling magnetoresistive) devices.

The electromagnetic coil element 12 has a plurality of layers, which is laminated on a thin-film laminated surface 111a of the slider-substrate 58, including a recording magnetic layer 12a and a thin-film coil 12b. The thin-film coil 12b is wound like a flat spiral about the recording magnetic layer 12a.

Then, in the electromagnetic coil element 12, when a current, modulated according to magnetic data to be recorded on the magnetic recording medium, flows through the thin-film coil 12b, the current causes the thin-film coil 12b to generate a recording magnetic field. Further, magnetic flux, in accordance with the recording magnetic field, is emitted from the recording magnetic layer 12a to the magnetic recording medium, the magnetic flux flows back to a not-illustrated return magnetic pole layer via the magnetic recording medium (a not-illustrated soft magnetic layer in detail).

The core layer 17 is a wave guide which guides laser light, generated by the later-described laser diode 130 of the light source-unit 152, from the light source-opposing surface 83 to the ABS 81.

The core layer 17 is formed with dielectric such as tantalum oxide ($TaO_x$) or the like. For example, the core layer 17 is able to be formed with $Ta_2O_5$ (for example, the refractive index is about 2.16).

The near-field light generating layer 28 generates near-field light for heating the magnetic recording medium. The near-field light generating layer 28 is made of metal and formed of, for example, one of Au, Ag, Al, Cu, Pd, Pt, Rh, Ir or an alloy made of a plurality of those elements.

(Light Source-Unit)

The light source-unit 152 has the laser diode 130 and the sub-mount 150. The laser diode 130 is joined to the sub-mount 150 to constitute the light source-unit 152. The laser diode 130 is joined to the sub-mount 150 so that a later-described emitting part 145a of the laser diode 130 is opposes to the core layer 17.

(Laser Diode)

The laser diode 130 will be explained with reference to FIG. 12 to FIG. 21, in addition to the FIG. 6 to FIG. 11. As illustrated in FIG. 6, the laser diode 130 has an n-substrate 140, an n-electrode 141, a light emitting layer 145, and a p-electrode 142, and has a rectangle parallelepiped shape. The n-electrode 141, having a stripe shape, is joined to a surface on the outside of the n-substrate 140. Further, not illustrated insulating layer is formed on both side of the n-electrode 141, along with the n-electrode 141. The surfaces of the insulating layer and the n-electrode 141 correspond to the outer surface 131.

Further, the light emitting layer 145 is formed on the n-substrate 140 opposite side of the n-electrode 141, and the p-electrode 142 is joined on the light emitting layer 145, via a ground layer 143.

The light emitting layer 145 has an active layer, an n-cladding layer, and a p-cladding layer, and has a structure in which the active layer is sandwiched between the n-cladding layer and the p-cladding layer. The active layer includes the emitting part (emitting part of laser light) 145a (see FIG. 8). Then, as illustrated in FIG. 7, FIG. 11, a junction-line 133 is formed on the outer surface 131 so as to clarify the position of the emitting part 145a. The outer surface 131 is the outside surface, opposing to the sub-mount 150, and it is formed in rectangular shape. A later-described electrode pad layer 160 is formed on a part, except for the junction-line 133, of the outer surface 131.

As illustrated in FIG. 7 to FIG. 9, the electrode pad layer 160 includes the solder-contact preventing part 163 and the solder-bonding pad part 164. The solder-contact preventing part 163 is formed with a later-described small wettability material so that solder does not touch with the solder-contact preventing part 163.

As illustrated in FIG. 7, the solder-contact preventing part 163 is formed in approximately U-figure shape in a plan view. The solder-contact preventing part 163 includes an outer preventing part 163a, an inner preventing part 163b and a linking preventing part 163c. The outer preventing part 163a is a part being formed between the solder-bonding pad part 164 and a peripheral end part 131a of the outer surface 131, and it is formed in a strip shape in a plan view. The inner preventing part 163b is a part which is formed inside of the solder-bonding pad part 164, it is arranged between the solder-bonding pad part 164 and the junction-line 133, and it is formed in the strip shape in a plan view. The outer preventing part 163a and the inner preventing part 163b oppose to each other by sandwiching the solder-bonding pad part 164, they are formed so that a width and a length of the outer preventing part 163a match with a width and a length of the inner preventing part 163b. As illustrated in FIG. 7, the outer preventing part 163a and the inner preventing part 163b are formed so that the length of the outer preventing part 163a and the inner preventing part 163b is L163, the width of the outer preventing part 163a and the inner preventing part 163b is W163. The linking preventing part 163c is a part which links the outer preventing part 163a with the inner preventing part 163b, and it is formed between the solder-bonding pad part 164 and the peripheral end part 131a.

Further, the solder-bonding pad part 164 is connected to the n-electrode 141. The solder-bonding pad part 164 is formed in the strip shape in a plan view. The solder-bonding pad part 164 is formed in a position which is inside the peripheral end part 131a, and sandwiched between the outer preventing part 163a and the inner preventing part 163b. The older-bonding pad part 164 is formed so that the width is W164 though, it is preferable that the width W163 of the outer preventing part 163a and the inner preventing part 163b is equal to the width W164 of the solder-bonding pad part 164, or the width W163 is larger than the width W164 (W163>W164).

Then, as illustrated in FIG. 12 to FIG. 17, in the laser diode 130, according to this embodiment, the electrode pad layer 160 includes a three layers structure which a first metal layer 161, a second metal layer 162 and a third metal layer 166 are laminated.

Figure 12:
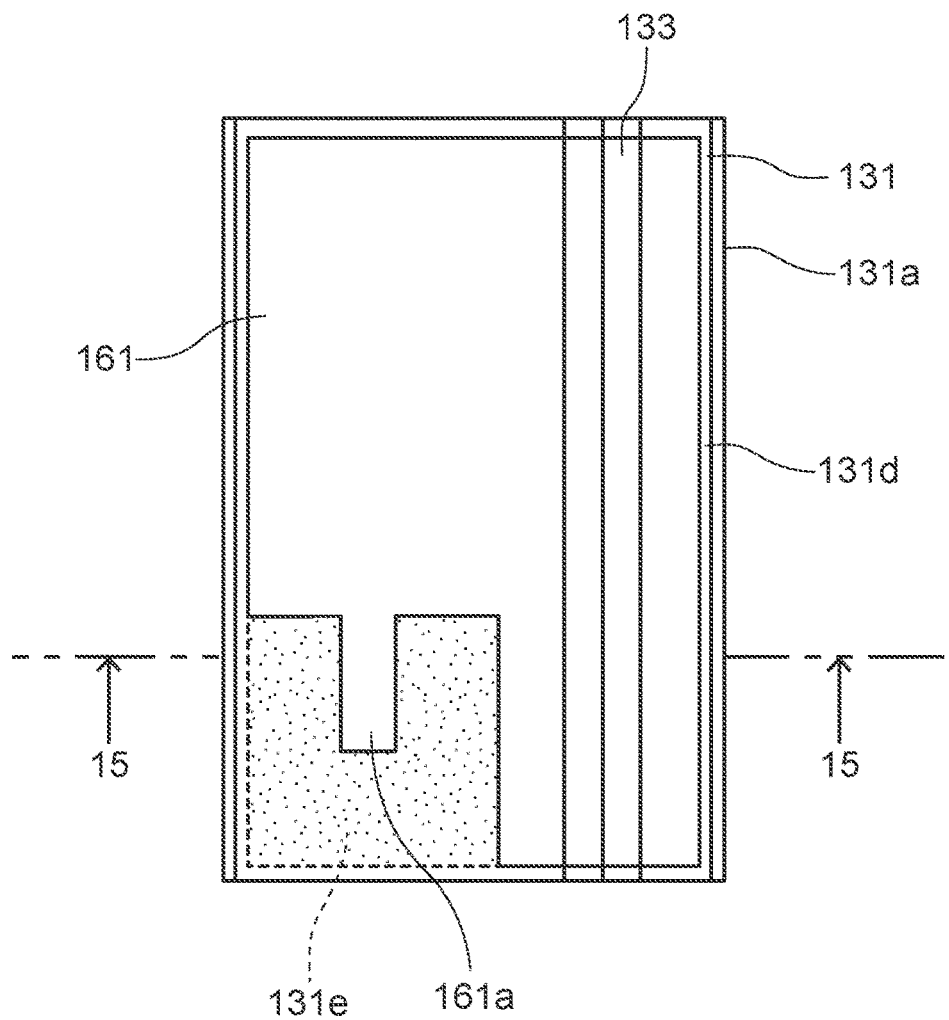
FIG. 12 is a plan view, similar with FIG. 7, showing the case when a first metal layer is formed on an outer surface of the laser diode.
Figure 13:
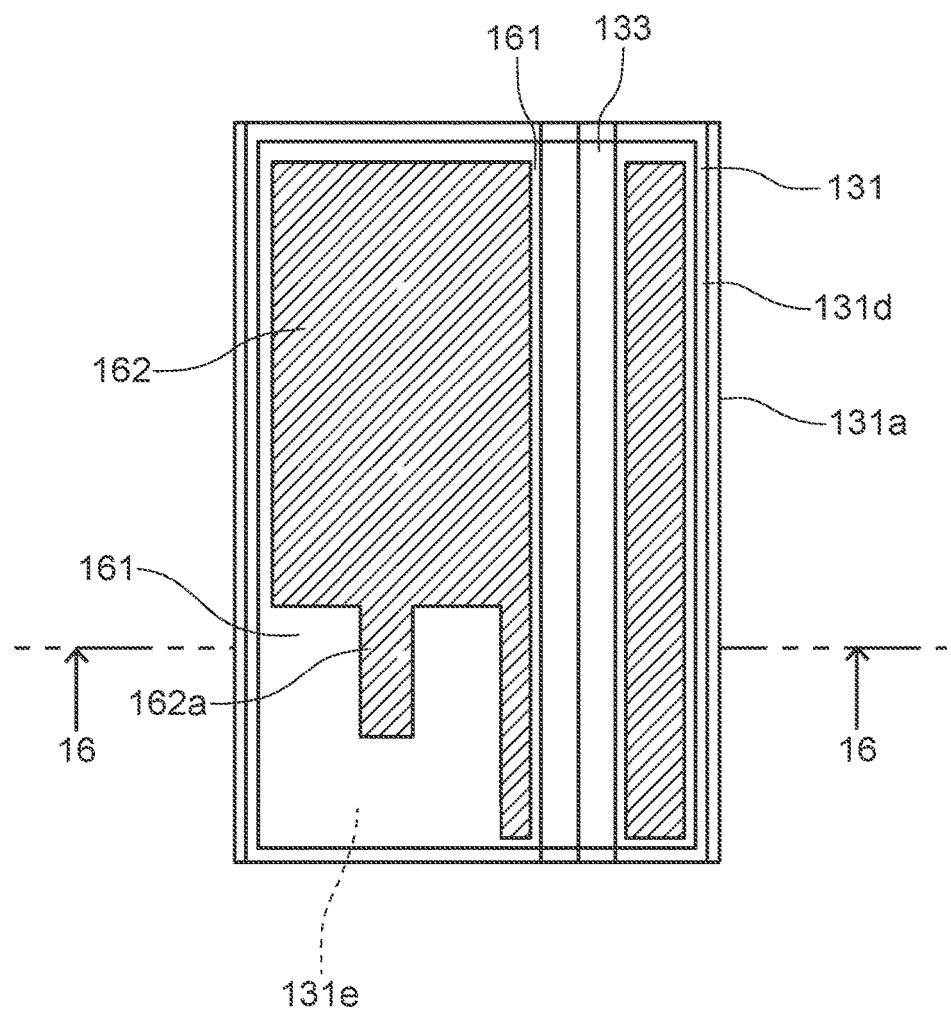
FIG. 13 is a plan view, similar with FIG. 7, showing the case when a second metal layer is formed on the laser diode in FIG. 12.
Figure 14:
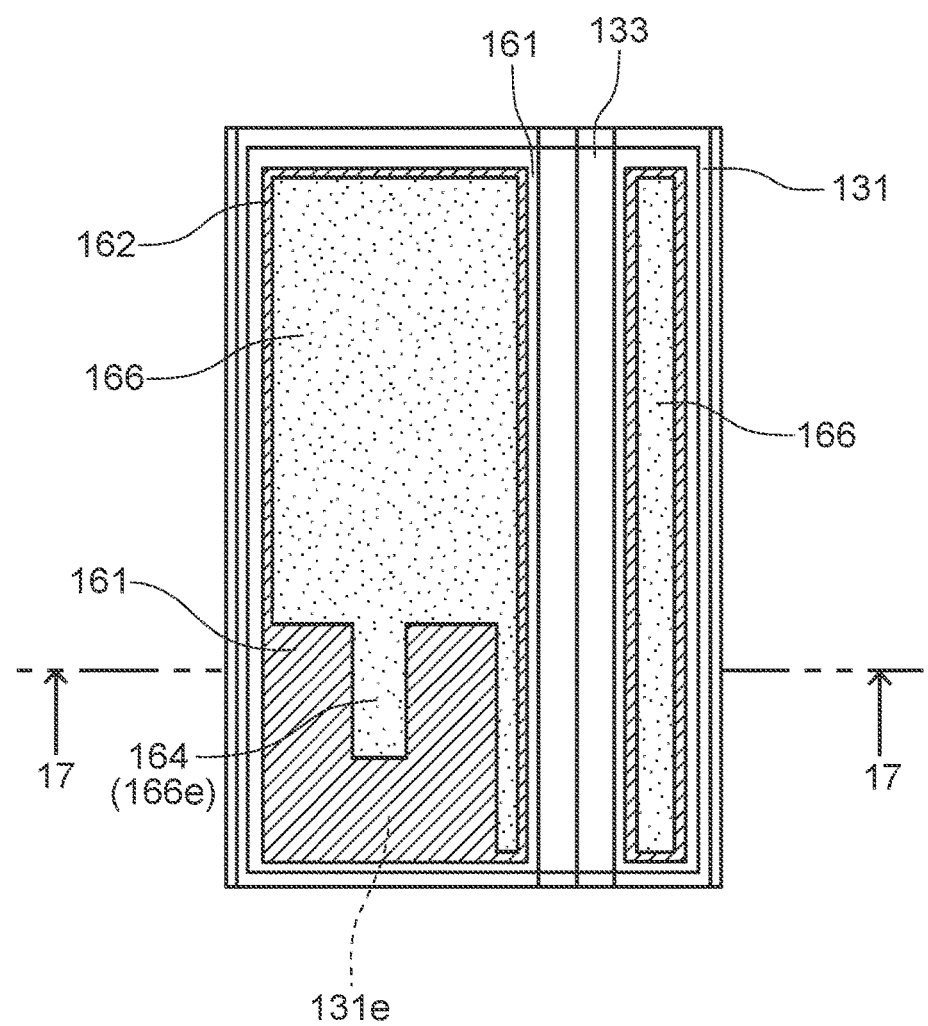
FIG. 14 is a plan view, similar with FIG. 7, showing the case when a third metal layer is formed on the laser diode in FIG. 13.
Figure 15:
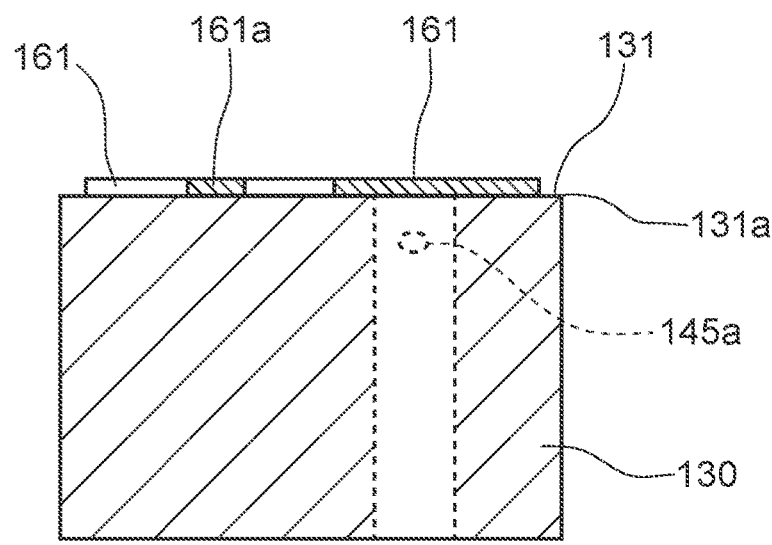
FIG. 15 is a sectional view, taken along the line 15-15 in FIG. 12.
Figure 16:
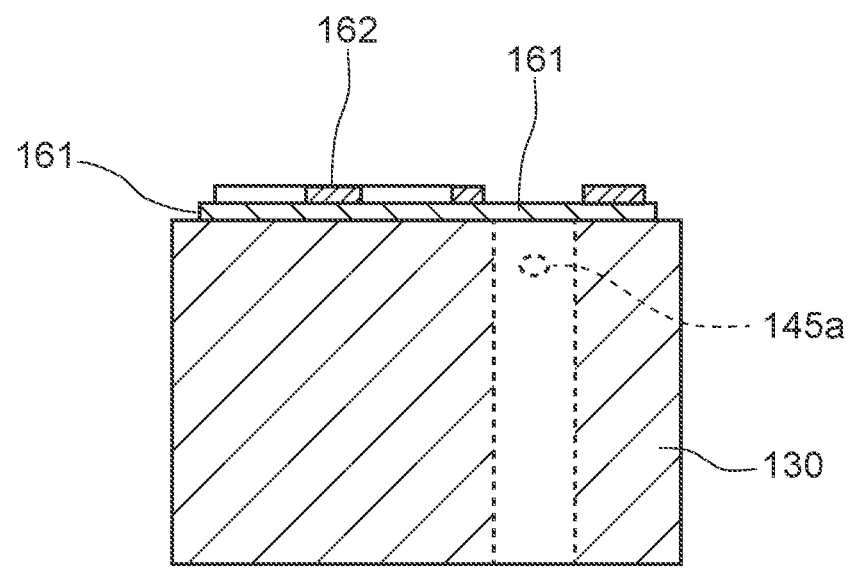
FIG. 16 is a sectional view, taken along the line 16-16 in FIG. 13.
Figure 17:
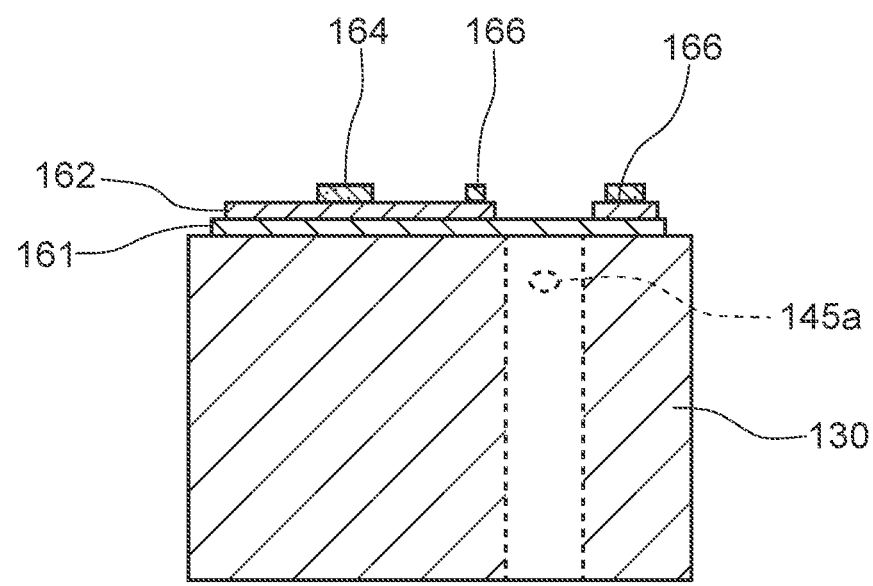
FIG. 17 is a sectional view, taken along the line 17-17 in FIG. 14.

As illustrated in FIG. 12, FIG. 15, the first metal layer 161 is formed on the outer surface 131. Further, as illustrated in FIG. 13, FIG. 16, the second metal layer 162 is formed on a surface of the first metal layer 161. Furthermore, as illustrated in FIG. 14, FIG. 17, the third metal layer 166 is formed on a surface of the second metal layer 162. A part of the third metal layer 166 (a strip like extending part 166e, illustrated in FIG. 14) corresponds to the solder-bonding pad part 164. The strip like extending part 166e is connected to the n-electrode 141, through the second metal layer 162 and the first metal layer 161. Further, as illustrated in FIG. 7, the solder-contact preventing part 163 is formed on the second metal layer 162 with the small wettability material.

The first metal layer 161 is formed by evaporation with a later-described large wettability material. As illustrated in FIG. 12, the first metal layer 161 is formed in a part, except for a peripheral annular part 131d of the outer surface 131 and a later-described preventing part expected zone 131e. The peripheral annular part 131d is a part which is along the peripheral end part 131a of the outer surface 131, and it is a rectangular annular part having a narrow width. The preventing part expected zone 131e is a part which is assigned as an area to form the solder-contact preventing part 163. The preventing part expected zone 131e is a part with dot in FIG. 12, and it is formed in the approximately U-figure shape in a plan view. The first metal layer 161 includes a strip like extending part 161a. The strip like extending part 161a is a strip like part which is formed in the preventing part expected zone 131e, and it is a part which the solder-bonding pad part 164 (a strip like extending part 166e) is formed.

The second metal layer 162 is formed by plating with the large wettability material, similar with the first metal layer 161. As illustrated in FIG. 13, the second metal layer 162 is formed directly on the surface of the first metal layer 161.

By the way, when plating is performed in a part except for the peripheral annular part 131d of the outer surface 131 and the junction-line 133, a film formed by the plating (a first plating film) is also formed in the preventing part expected zone 131e. The first metal layer 161 is not formed in the preventing part expected zone 131e though, when the first plating film is formed in the preventing part expected zone 131e, the first plating film is connected with the first metal layer 161. Therefore, the first metal layer 161 is formed in the approximately whole of the outer surface 131 including the preventing part expected zone 131e. Further, as illustrated in FIG. 13, a part, of the first plating film, being formed on the first metal layer 161 becomes the second metal layer 162 (a part with hatching in FIG. 13 becomes the second metal layer 162). Further, a part of the second metal layer 162 is formed on the strip like extending part 161a, as a strip like extending part 162a (the strip like extending part 161a is omitted in FIG. 13).

Further, as illustrated in FIG. 14, when plating is performed with the large wettability material, similar with the second metal layer 162, for the second metal layer 162, a film formed by the plating (a second plating film) is formed in the preventing part expected zone 131e. The second metal layer 162 is not formed in the preventing part expected zone 131e though, when the second plating film is formed in the preventing part expected zone 131e, the second plating film is connected with the second metal layer 162. Therefore, the second metal layer 162 is formed in the part, of the outer surface 131, except for the junction-line 133. Further, as illustrated in FIG. 14, a part, of the second plating film, being formed on the second metal layer 162 becomes the third metal layer 166 (a part with hatching in FIG. 14 becomes the third metal layer 166). Then, the strip like extending part 166a, of the third metal layer 166, being formed on the preventing part expected zone 131e, is the solder-bonding pad part 164. After that, when plating is performed with the small wettability material so as to surround the solder-bonding pad part 164, the solder-contact preventing part 163 is formed (see FIG. 7).

Furthermore, the solder-contact preventing part 163 and the solder-bonding pad part 164 are formed as following. Namely, as illustrated in FIG. 9 in detail, the solder-contact preventing part 163 and the solder-bonding pad part 164 are formed so that a pad height h2 is larger than a preventing height h1 (h2>h1).

Here, the pad height h2 is a height from the outer surface 131 to a surface 164a of the solder-bonding pad part 164. The preventing height h1 is a height from the outer surface 131 to a surface of the solder-contact preventing part 163 (height to a surface 163aa of the outer preventing part 163a and a surface 163ba of the inner preventing part 163b). Besides, the solder-bonding pad part 164 has a thickness (thickness on the second metal layer 162) T2. The solder-contact preventing part 163 (the outer preventing part 163a, the inner preventing part 163b and the linking preventing part 163c) has a thickness (thickness on the second metal layer 162) T1. Concerning the thicknesses T1, T2, the thickness T2 of the solder-bonding pad part 164 is larger than the thickness T1 of the solder-contact preventing part 163 (T2>T1).

Figure 18:
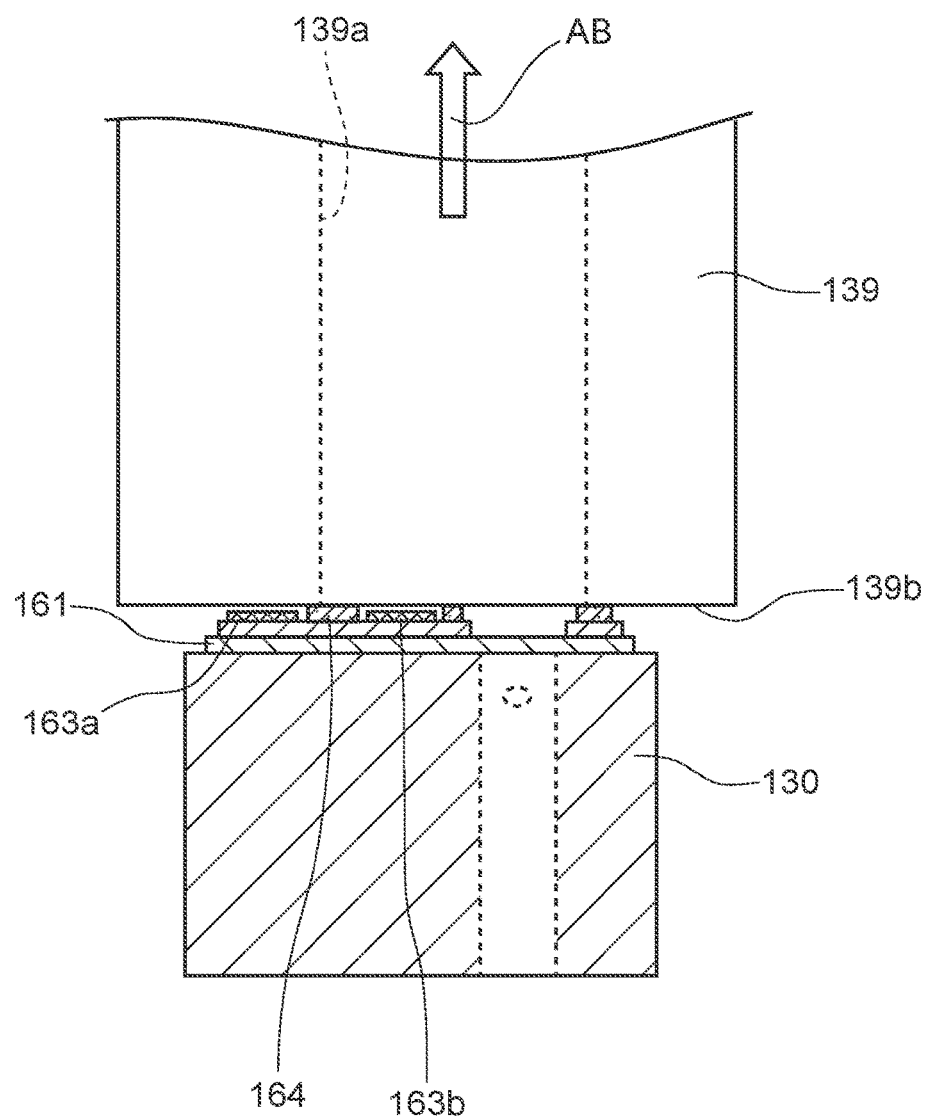
FIG. 18 is a sectional view, similar with FIG. 8, schematically showing the case when the laser diode in FIG. 7 is absorbed by an absorption collet.
Figure 19:
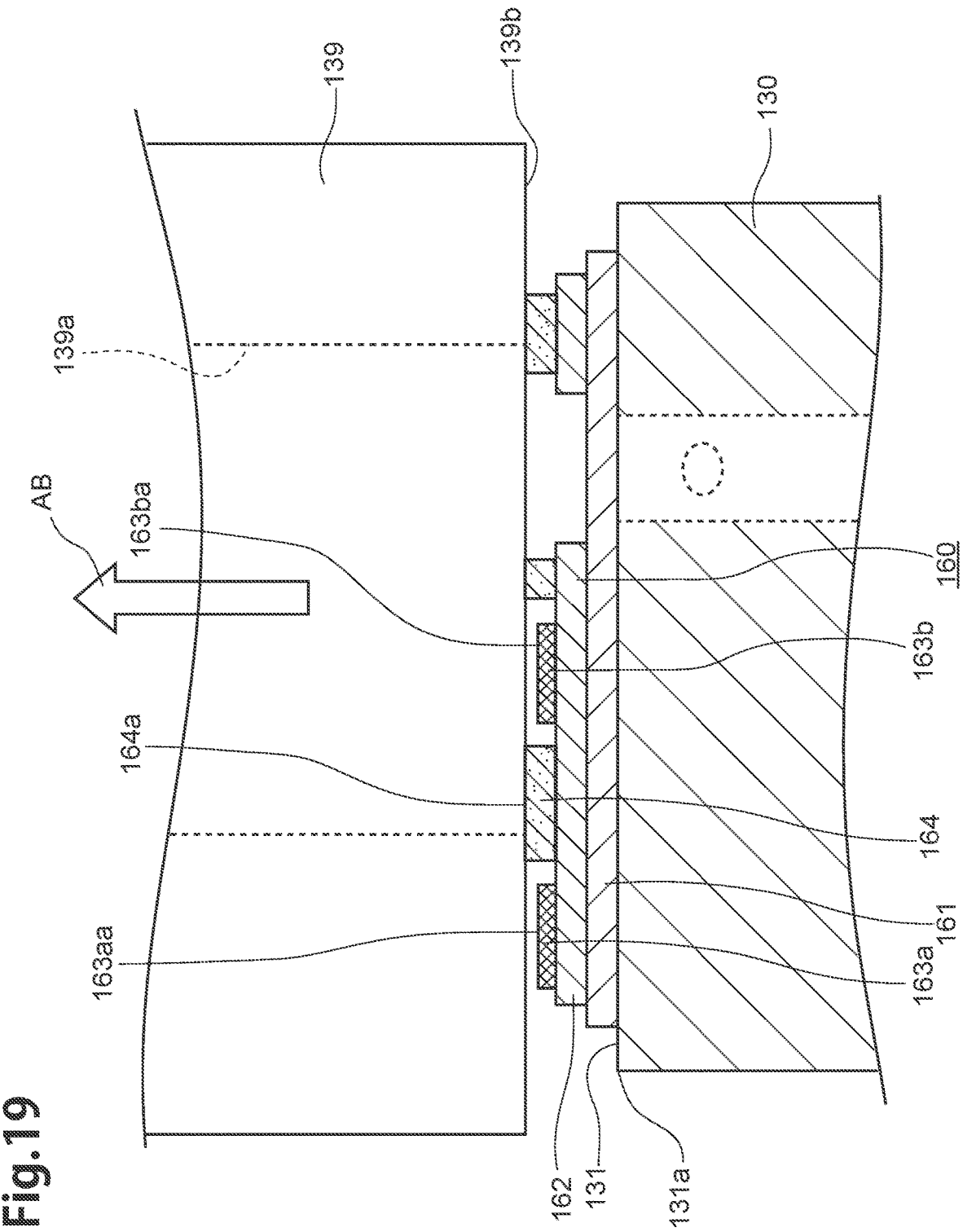
FIG. 19 is a sectional view, with enlargement, of the principal part in FIG. 18.
Figure 20:
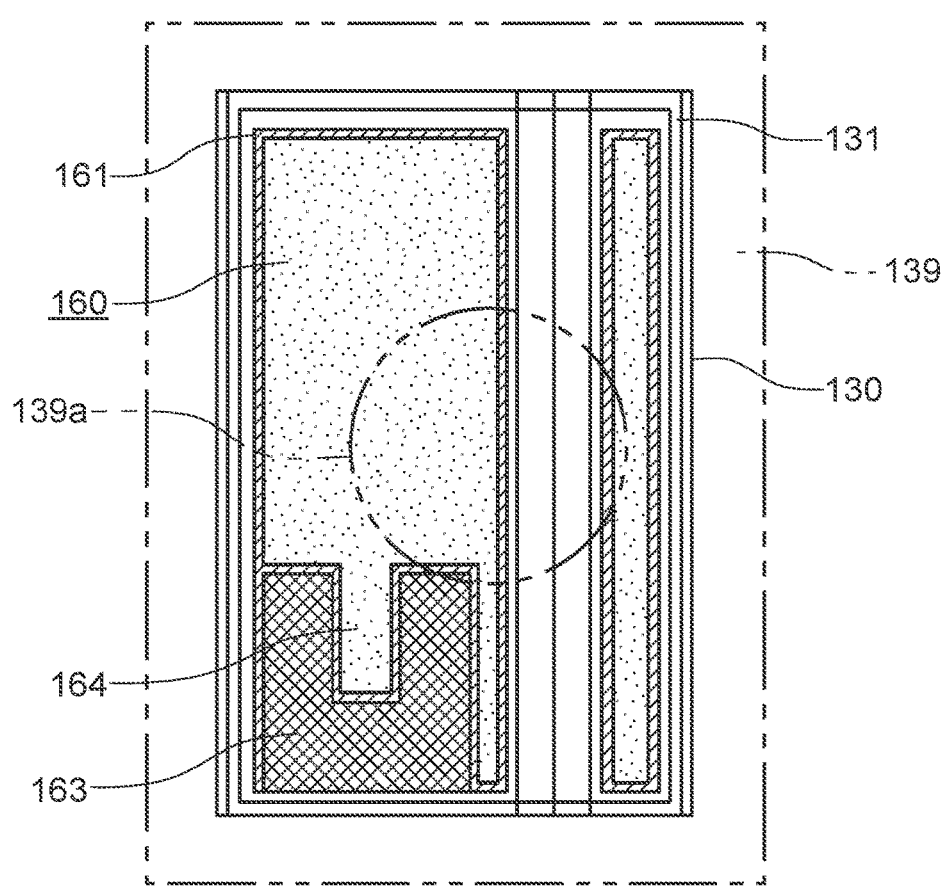
FIG. 20 is a plan view, similar with FIG. 7, schematically showing a positional relation of the laser diode in FIG. 7 and the absorption collet.
Figure 21:
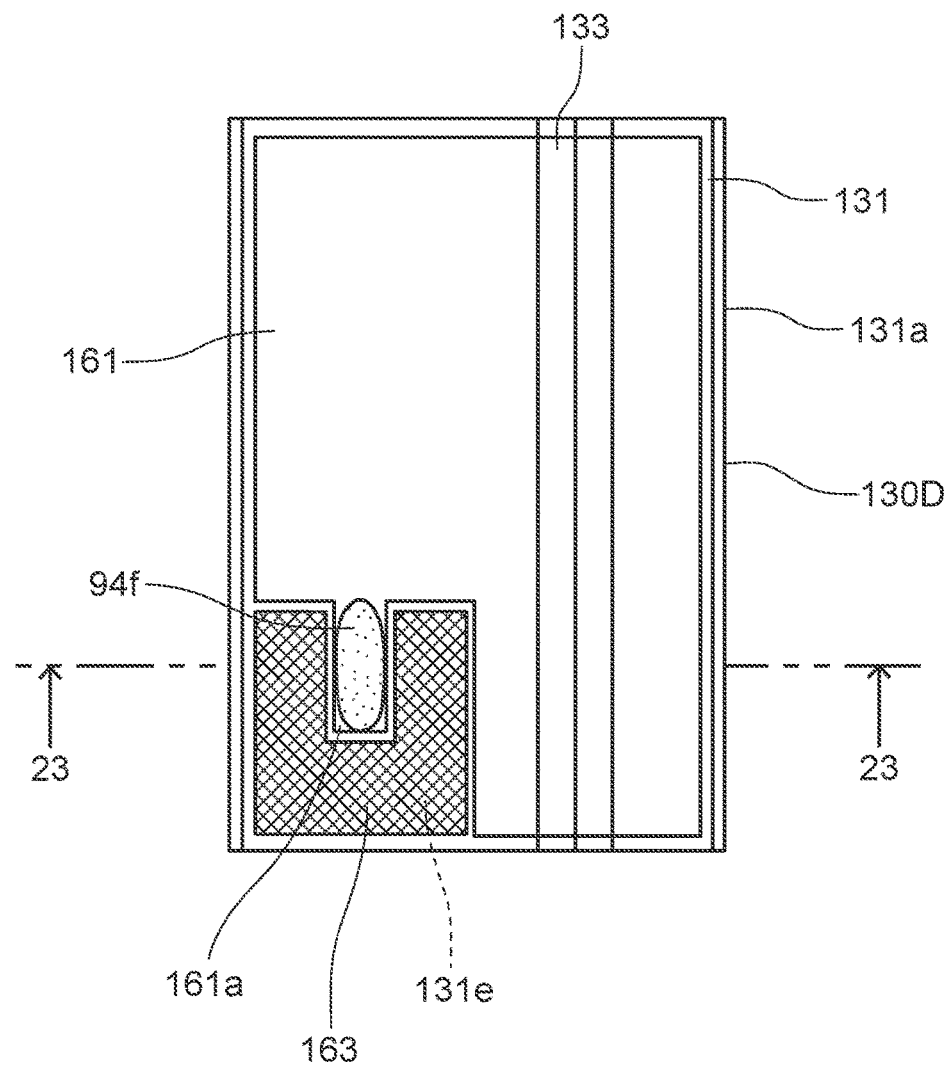
FIG. 21 is a plan view, similar with FIG. 7, showing the laser diode according to a modified example 1.

On the other hand, the laser diode 130 is absorbed by an absorption collet 139 during the step of manufacturing the light source unit 152. At this time, as illustrated in FIG. 18, FIG. 19, FIG. 20, the outer surface 131, which the electrode pad layer 160 is formed, of the laser diode 130 is absorbed by an absorption AB of the absorption collet 139. The outer surface 131 is absorbed to an absorption surface 139b which an absorption hole 139a is formed.

At this time, the electrode pad layer 160 is in contact with the absorption surface 139b though, the pad height h2 is larger than the preventing height h1. Therefore, the surface 164a of the solder-bonding pad part 164 is in contact with the absorption surface 139b though, the laser diode 130 is absorbed without contact of the surfaces 163aa, 163ba of the solder-contact preventing part 163 with the absorption surface 139b.

(Small Wettability Material and Large Wettability Material)

The small wettability material has solder wettability which is smaller than solder wettability of the solder-bonding pad part 164. Solder wettability means nature which solder spreads over a metal surface as solder is wet (spreads over without being repelled). Solder wettability of the small wettability material, according to the embodiment, is as small as solder is repelled. Therefore, when solder is applied on the solder-contact preventing part 163, the solder is repelled by the solder-contact preventing part 163. Accordingly, soldering is not able to be realized to the solder-contact preventing part 163. In this embodiment, as the above-described small wettability material, titanium (Ti) is used though, nickel (Ni), aluminum (Al) is able to be used.

The large wettability material has solder wettability which is larger than solder wettability of the solder-contact preventing part 163. Solder wettability of the large wettability material, according to the embodiment, is as large as solder spreads over without being repelled. In case of the large wettability material, solder spreads over without being repelled, soldering is able to be realized to the solder-bonding pad part 164. In this embodiment, as the above-described large wettability material, gold (Au) is used though, another metal is able to be used.

By the way, when liquid is dripped on a surface of a solid, liquid becomes round by personal surface tension, thereby droplet is formed. When solder in melting condition is dripped on a surface of a solid, droplet of solder is formed, similar with the above. At this time, the angle, formed by the tangent of the droplet and the surface of the solid, is a contact angle. When the contact angle is large, wettability is low (small). When the contact angle is small, wettability is high (large). Therefore, it is preferable that the small wettability material and large wettability material is decided in accordance with the magnitude of the contact angle.

Then the solder-bonding pad part 164 is formed with large wettability material, and the solder-contact preventing part 163 is formed with small wettability material. Therefore, solder wettability of the solder-contact preventing part 163 is smaller than solder wettability of the solder-bonding pad part 164. Because solder is hard to wet to the solder-contact preventing part 163 in comparison with the solder-bonding pad part 164, even if solder touch with the solder-bonding pad part 164, solder is likely not to touch with the solder-contact preventing part 163. Then, if there is difference concerning solder wettability, as described-above, it is possible that a contact area of solder is limited in the solder-bonding pad part 164, thereby solder projection is prevented. Accordingly, concerning solder wettability of the solder-bonding pad part 164 and the solder-contact preventing part 163, it is sufficient that the former is larger than the latter, it is possible that the difference of solder wettability between them is small than the difference between Au and Ti.

(Sub-Mount)

The sub-mount 150 is made of a ceramic material such as aluminum oxide-titanium carbide ($Al_2O_3 \cdot TiC$) or the like, and it is formed in a rectangular parallelepiped shape. The sub-mount 150 has a size larger than the laser diode 130. Further, the sub-mount 150 is able to be formed with semiconductor material such as Si, GaAs, SiC or the like. As illustrated in FIG. 6, the sub-mount 150 is connected to the wiring member 75 with a solder connector 199 A.

(Method of Manufacturing the Head Gimbal Assembly)

Figure 31:
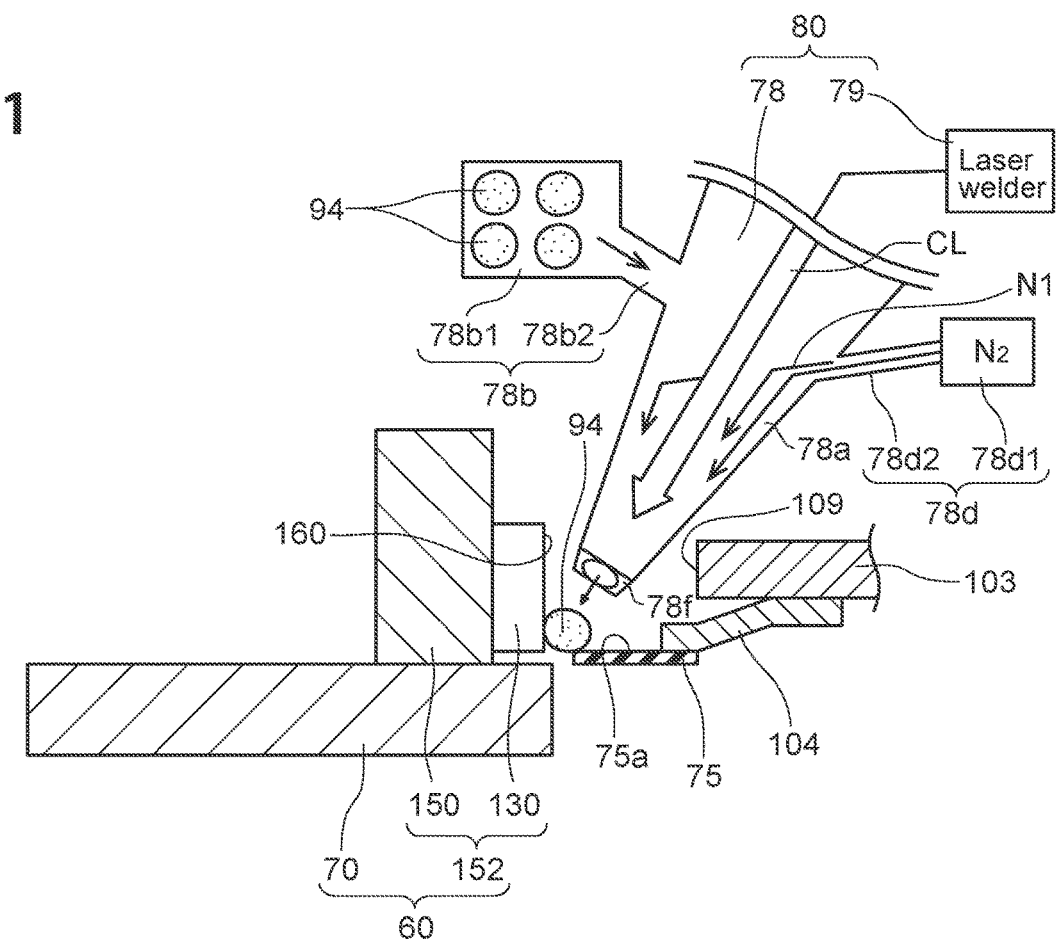
FIG. 31 is a sectional view showing a solder ball arrangement step of the method of manufacturing the HGA according to the embodiment of the present invention.
Figure 32:
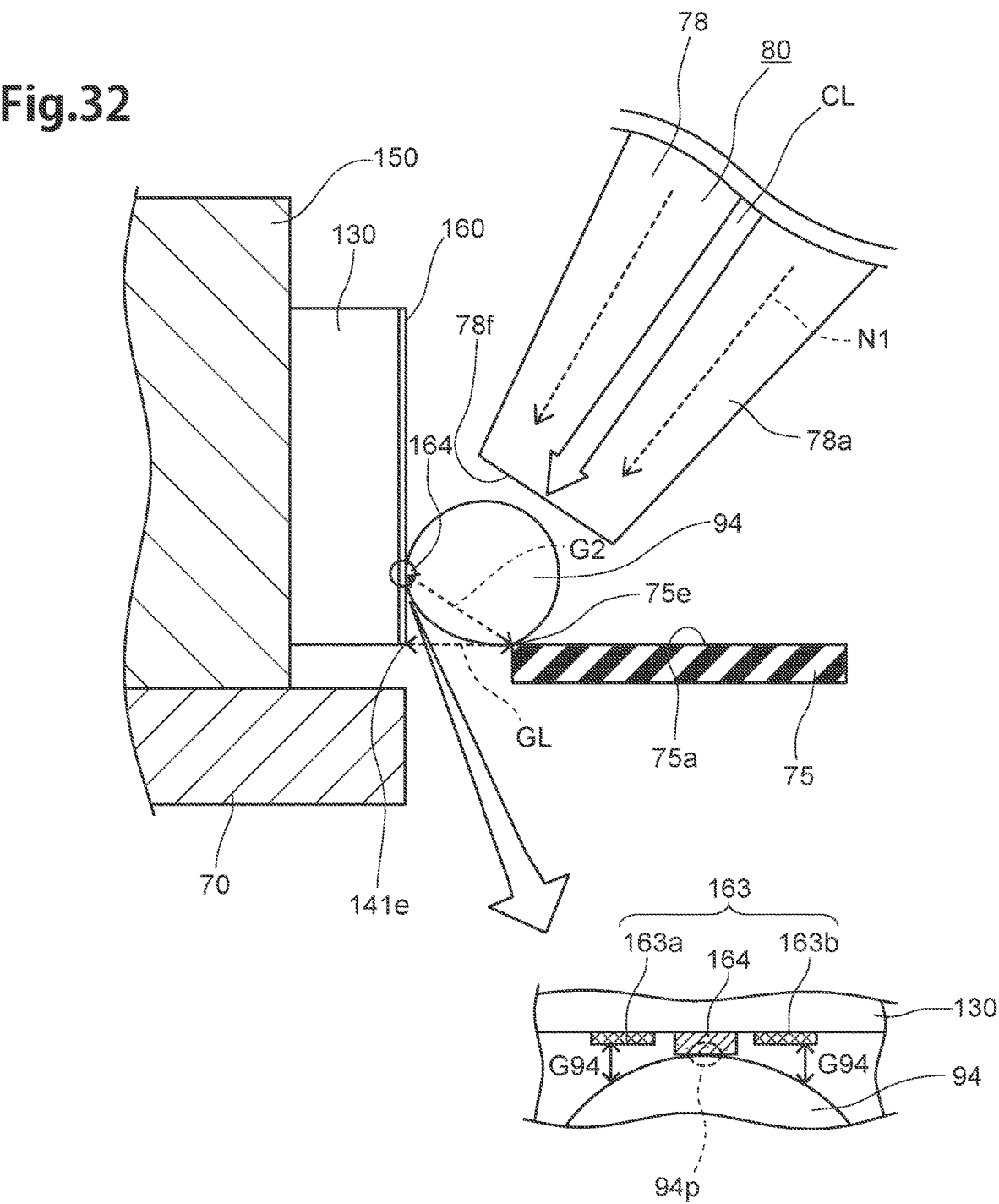
FIG. 32 is a sectional view showing a connecting ball attaching step subsequent to the solder ball arrangement step in FIG. 31.

Subsequently, the method of manufacturing the HGA 101, according to the embodiment of the present invention will be explained with reference to FIG. 31 and FIG. 32. FIG. 31 a sectional view showing a solder ball arrangement step of the method of manufacturing the HGA 101 according to the embodiment of the present invention. FIG. 32 is a sectional view showing a connecting ball attaching step subsequent to the solder ball arrangement step in FIG. 31

The method of manufacturing, according to the present invention, includes a head connecting step. In the head connecting step, the above-described thermally assisted magnetic head 60 is connected to the suspension 50. The solder ball arrangement step and the connecting ball attaching step are included in the head connecting step. The method of manufacturing, according to the present invention, is characterized by the solder ball arrangement step.

Then, in the solder ball arrangement step, a solder ball is arranged so that the laser diode 130 is connected to the flexure 106 for the above-described assembly structure.

At this time, the solder is arranged with a later-described jetting apparatus 80. In that case, a later-described connecting ball 94 is used as the solder ball. The connecting ball 94 is arranged so that the connecting ball 94 touches with the electrode pad layer 160 (the solder-bonding pad part 164, in detail) and the flexure 106 (wiring member 75).

Here, the connecting ball 94 is a solder ball, having the size, which is larger than a later-described wiring gap G2 (see FIG. 32), and it is in an unmelted-solid condition.

In the present invention, the unmelted-solid condition means condition which solder is in unmelted condition (is not melting) and it has a constant form which is in solid condition. The connecting ball 94 is a minute granule like member, made of unmelted solder, and it has a ball like form. As illustrated in FIG. 32, the wiring gap G2 is the distance between the solder-bonding pad part 164 of the laser diode 130 and a part, of the wiring member 75 (wiring end part 75e), which is nearest to the electrode pad layer 160.

The connecting ball 94 has the size, which is larger than the wiring gap G2. Therefore, when the solder ball arrangement step is performed, as illustrated in FIG. 32, the connecting ball 94 is kept by the electrode pad layer 160 and the wiring end part 75e.

On the other hand, the connecting ball 94 is in the unmelted-solid condition. It is supposed that the solder ball in melting condition, being different from the connecting ball 94, is attached to the electrode pad layer 160. Then, because the soler ball is jetted out from the jetting apparatus 80, the soler ball hits (touches with) the electrode pad layer 160 in a condition keeping the kinetic energy in the jetting out. Because an outer surface of the solder ball is a spherical surface, an extremely small part of the solder ball touches with the solder-bonding pad part 164.

However, because the solder ball is in melting condition, the solder ball is deformed when it hits the electrode pad layer 160. Solder of the solder ball is likely to spread out in the outside of the solder-bonding pad part 164 by the deformation of the solder ball. Then, because the solder-contact preventing part 163 is formed with the small wettability material, it repels solder though, when the solder spreads over widely from the solder-bonding pad part 164, being extremely small amount solder though, it has the possibility that solder touches with the solder-contact preventing part 163.

On the other hand, because the connecting ball 94 in the unmelted-solid condition is in solid condition, even if it hits the electrode pad layer 160, the form is kept, thereby, the connecting ball 94 is not deformed. Therefore, an extremely small area of the connecting ball 94 (a later-described contact point 94P) touches with the electrode pad layer 160 (solder-bonding pad part 164), and the condition is kept. Therefore, solder never spreads over the solder-contact preventing part 163.

Accordingly, when the connecting ball 94 is arranged so that the laser diode 130 is connected with the flexure 106, it is preferable that the connecting ball 94 is in unmelted-solid condition.

Then, when the connecting ball 94 is arranged so that the laser diode 130 is connected with the flexure 106, as illustrated in FIG. 32, the connecting ball 94 touches with the solder-bonding pad part 164 of the electrode pad layer 160. At this time, the solder ball arrangement step is performed with positioning of the connecting ball 94 so that a part of the connecting ball 94 (a later-described contact point 94P) touches with the solder-bonding pad part 164.

The connecting ball attaching step is performed subsequent to the solder ball arrangement step. The connecting ball attaching step is performed so that the connecting ball 94 is attached to the wiring end part 75e in addition to the solder-bonding pad part 164 and the exposed wiring surface 75a.

As illustrated in FIG. 31, the jetting apparatus 80 is used in both the connecting ball attaching step and the above-described solder ball arrangement step, according to this embodiment. The jetting apparatus 80 includes a supply apparatus 78 and a laser welder 79. The supply apparatus 78 includes a capillary 78a, a solder ball supply part 78b and a nitrogen gas supply part 78d. The capillary 78a is a hollow member which is formed gradually narrow toward an edge part 78f. The capillary 78a jets out the connecting ball 94 from the edge part 78f, thereby the connecting ball 94 touches with the electrode pad layer 160 and the wiring end part 75e. The solder ball supply part 78b and the nitrogen gas supply part 78d are provided in the middle of the capillary 78a.

The solder ball supply part 78b includes a ball accommodating part 78b1 which the connecting balls 94 are accommodated, and a pipe 78b2 which connects the ball accommodating part 78b1 with the capillary 78a. The nitrogen gas supply part 78d includes a nitrogen gas sending part 78d1 and a pipe 78d2 which connects the nitrogen gas sending part 78d1 to the capillary 78a.

The laser welder 79 generates continuous wave laser (laser light) CL, and it supplies the continuous wave laser CL to the connecting ball 94 via the capillary 78a of the supply apparatus 78.

Then, as also illustrated in FIG. 32, in the method of manufacturing, according to the embodiment, the following processes A1, A2 are performed in the order of A1, A2.

Processes A1 In the solder ball arrangement step, at first, the connecting ball 94 is supplied from the solder ball supply part 78b to the capillary 78a and the capillary 78a jets out the connecting ball 94 from the edge part 78f, thereby the connecting ball 94 touches with the solder-bonding pad part 164 of the electrode pad layer 160 and wiring end part 75e.

Processes A2 In the connecting ball attaching step, the continuous wave laser CL is supplied from the laser welder 79 in a condition which nitrogen gas N1 of normal temperature is supplied from the nitrogen gas supply part 78d, and the continuous wave laser CL is irradiated to the connecting ball 94.

In the processes A2, because temperature of the nitrogen gas N1 is normal, even if the nitrogen gas N1 is irradiated to the connecting ball 94, the connecting ball 94 remains unmelted condition. However, when the continuous wave laser CL is irradiated to the connecting ball 94, the connecting ball 94 melts from energy of the continuous wave laser CL. Because the continuous wave laser CL is irradiated with a constant energy which does not vary with time, a constant energy, which does not vary with time, is supplied to the connecting ball 94. Therefore, the connecting ball 94 gradually melts in accordance with receiving the continuous wave laser CL.

Then, in accordance with melting the connecting ball 94, the part, of the connecting ball 94, which touches with the solder-bonding pad part 164 (the contact point 94P, see FIG.

32) gradually spreads outside. And the part which touches with the wiring member 75 also gradually spreads from the wiring end part 75e.

However, in the electrode pad layer 160, the solder-contact preventing part 163 is formed so as to surround the solder-bonding pad part 164. Because the solder-contact preventing part 163 repels the connecting ball 94 in melting condition, even if the connecting ball 94 melts, the contact point 94P remains on the solder-bonding pad part 164. The connecting ball 94 does not spreads over the solder-contact preventing part 163.

Further, because the pad height h2 of the solder-bonding pad part 164 is larger than the preventing height h1 of the solder-contact preventing part 163, a gap G94, from the connecting ball 94 to the solder-contact preventing part 163, is obtained (FIG. 32). Therefore, contact with the connecting ball 94 and the solder-contact preventing part 163 is surely prevented. In this way, the connection part 199X is formed, as illustrated in FIG. 11.

On the other hand, the part, which does not touch with the electrode pad layer 160 and the wiring member 75, remains in a form like a surface of a ball. Thereby the solder connector 199 is formed.

(Operation and Effect of the Laser Diode 130, the Thermally Assisted Magnetic Head 60, the Head Gimbal Assembly 101)

As described above, the laser diode 130 includes the electrode pad layer 160, the solder-contact preventing part 163 and the solder-bonding pad part 164 are included in the electrode pad layer 160. The solder-contact preventing part 163 is formed with the small wettability material, such as titanium (Ti), nickel (Ni), aluminum (Al), and the solder-bonding pad part 164 is formed with the large wettability material such as gold (Au). Then, solder spreads over the surface of the solder-bonding pad part 164 without being repelled though, solder does not spread over the surface of the solder-contact preventing part 163. Because the solder-contact preventing part 163 is formed with titanium (Ti), solder is repelled by the solder-contact preventing part 163. Such the solder-contact preventing part 163 is formed so as to surround the solder-bonding pad part 164. Therefore, when solder touch with the solder-bonding pad part 164, the solder remains on the solder-bonding pad part 164 without spreading over outside of the solder-bonding pad part 164.

Accordingly, the laser diode 130 includes a structure which solder is able to be surely connected with a predetermined position of the laser diode. Therefore, the short circuit, lowering of performance and reliability by solder bonding, never occurs, in the laser diode 130, the thermally assisted magnetic head 60 and the Head Gimbal Assembly 101.

Further, the solder-bonding pad part 164 is formed in the position being inside the peripheral end part 131a, and the outer preventing part 163a and the inner preventing part 163b are respectively formed in the outside of the solder-bonding pad part 164, between the solder-bonding pad part 164 and the junction-line 133. Accordingly, when solder touches with the solder-bonding pad part 164, flowing over of solder, to the side surface 130m (see FIG. 8), to the junction-line 133, is surely prevented. Further, because the solder-contact preventing part 163 includes the linking preventing part 163c, flowing over of solder, to the emitting surface (surface which the emitting part 145a is formed), is also surely prevented.

Then, the solder-bonding pad part 164, the solder-contact preventing part 163 are formed so that the pad height h2 is larger than the preventing height h1 (h2>h1, see FIG. 9).

Therefore, as illustrated in FIG. 18 to FIG. 20, when the laser diode 130 is absorbed by the absorption collet 139, the solder-contact preventing part 163 never touches with the absorption surface 139b. The solder-contact preventing part 163 is formed with, for example, titanium (Ti), the solder-contact preventing part 163 is likely to be damaged. When the solder-contact preventing part 163 is damaged, solder is likely not to be repelled by the solder-contact preventing part 163. Therefore, the solder-contact preventing part 163 and the solder-bonding pad part 164 are formed so that the pad height h2 is larger than the preventing height h1, thereby it is possible that the solder-contact preventing part 163 is not damaged.

Further, as illustrated in FIG. 32, because the pad height h2 is larger than the preventing height h1, the distance, from the connecting ball 94 to the solder-contact preventing part 163 (the outer preventing part 163a and the inner preventing part 163b), in the case when the connecting ball 94 touches with the solder-bonding pad part 164, is able to be secured with certain size, as compared with the case which the pad height h2 is equal to the preventing height h1. Therefore, solder is hard to touch with the solder-contact preventing part 163, it is possible that solder surely remains on the solder-bonding pad part 164.

The solder-bonding pad part 164 has the thickness which is larger than the thickness of the solder-contact preventing part 163 (T2>T1). Therefore, both the solder-bonding pad part 164 and the solder-contact preventing part 163 are formed on the second metal layer 162, thereby the structure, which the pad height h2 is larger than the preventing height h1, is obtained Further, because the width W163 is equal to or larger than the width W164 (W163≥W164), solder spreading, in the left right direction, is surely prevented.

Figure 25:
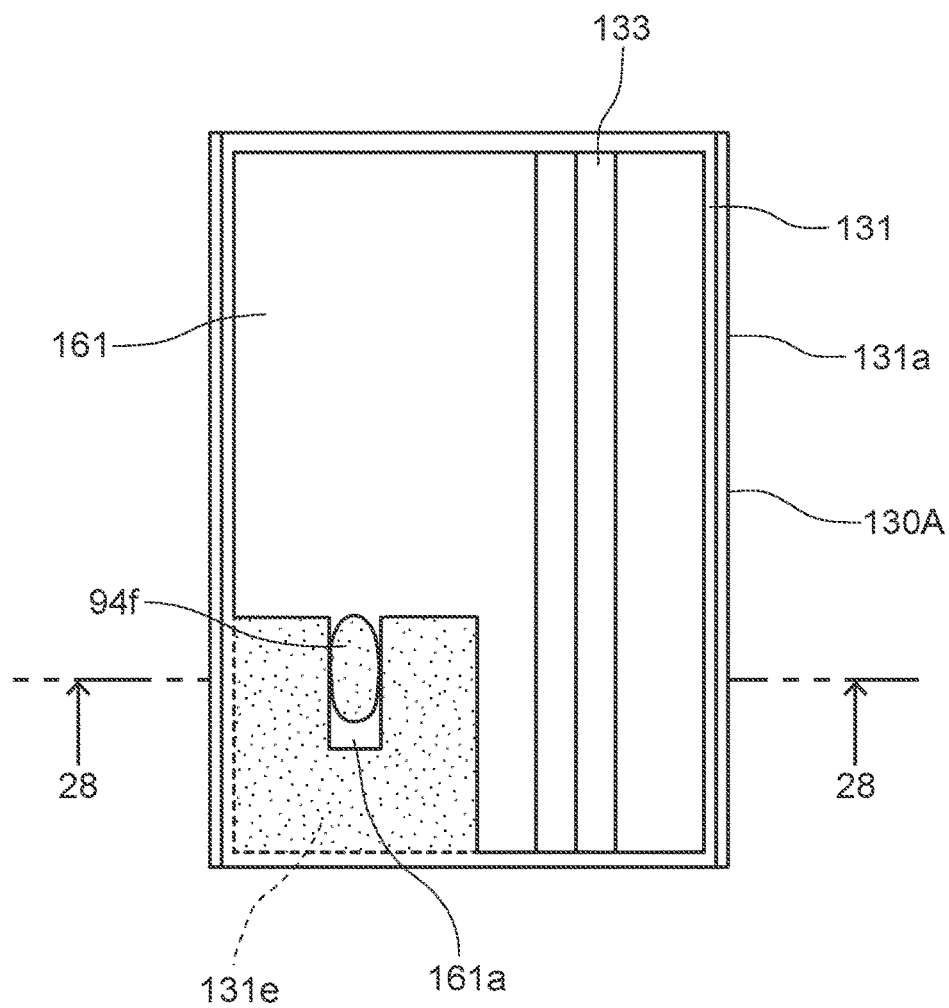
FIG. 25 is a plan view, similar with FIG. 7, showing the laser diode when the first metal layer is formed on the outer surface and an end part of a connecting ball.
Figure 28:
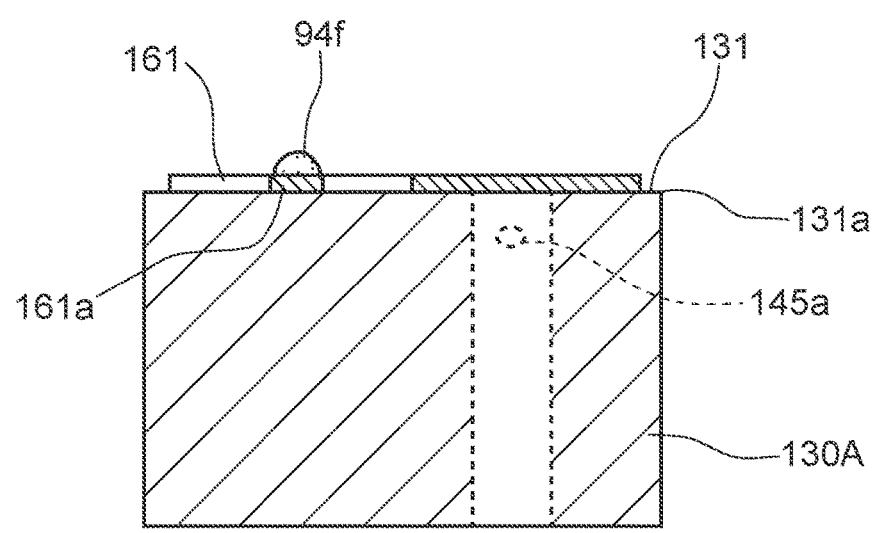
FIG. 28 is a sectional view, taken along the line 28-28 in FIG. 25.

By the way, as the laser diode 130A, illustrated in FIG. 25, FIG. 28, the case, which the first metal layer 161 is directly formed on the outer surface 131, is supposed. When the connecting ball 94 touches with the strip like extending part 161a, if solder wettability of the outer surface 131 (the preventing part expected zone 131e) is lower than the solder wettability of the first metal layer 161, an end part 94f of the connecting ball 94 remains on the strip like extending part 161a, it does not spread out the outside. Therefore, solder is connected with the predetermined position without the solder-contact preventing part 163.

However, in the laser diode 130A, the first metal layer 161 is likely to peel off from the outer surface 131. The strip like extending part 161a, which contact of the connecting ball 94 is expected, is also likely to peel off from the outer surface 131.

Figure 26:
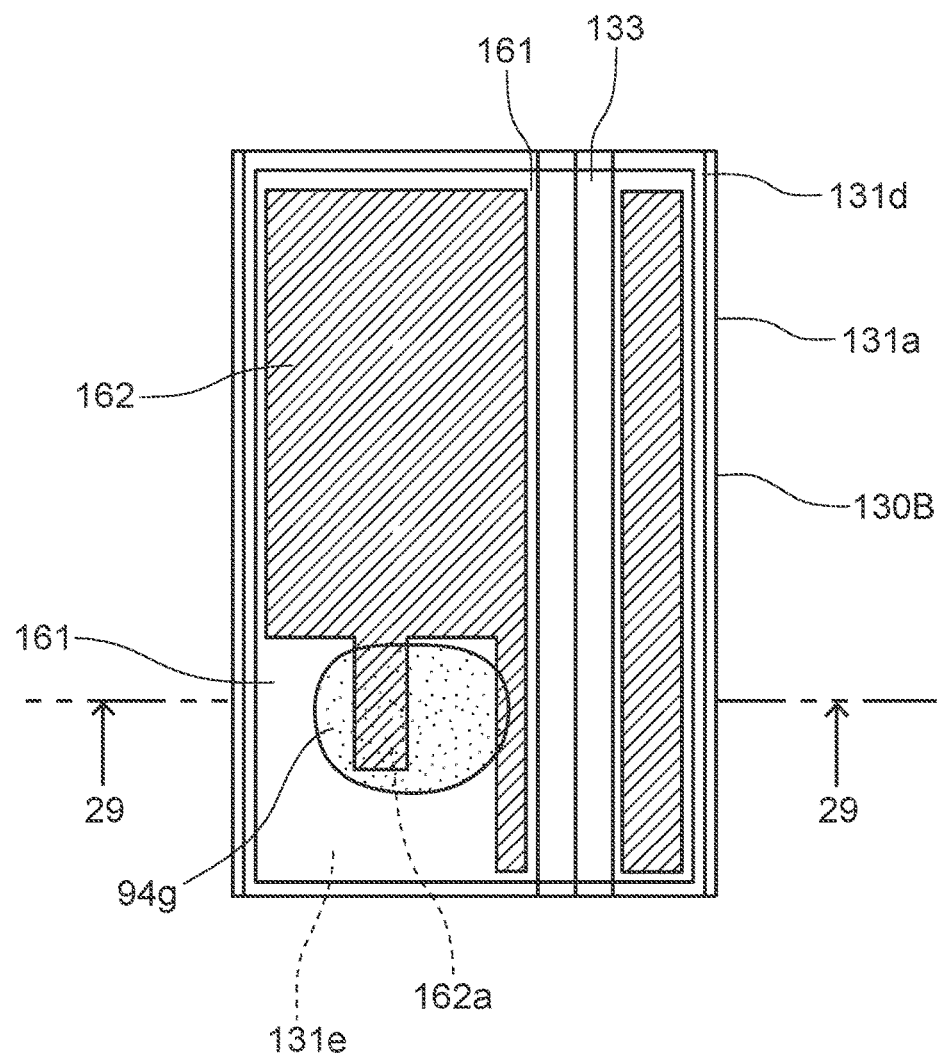
FIG. 26 is a plan view, similar with FIG. 7, showing the laser diode when the first, second metal layers are formed on the outer surface and the end part of a solder part.
Figure 29:
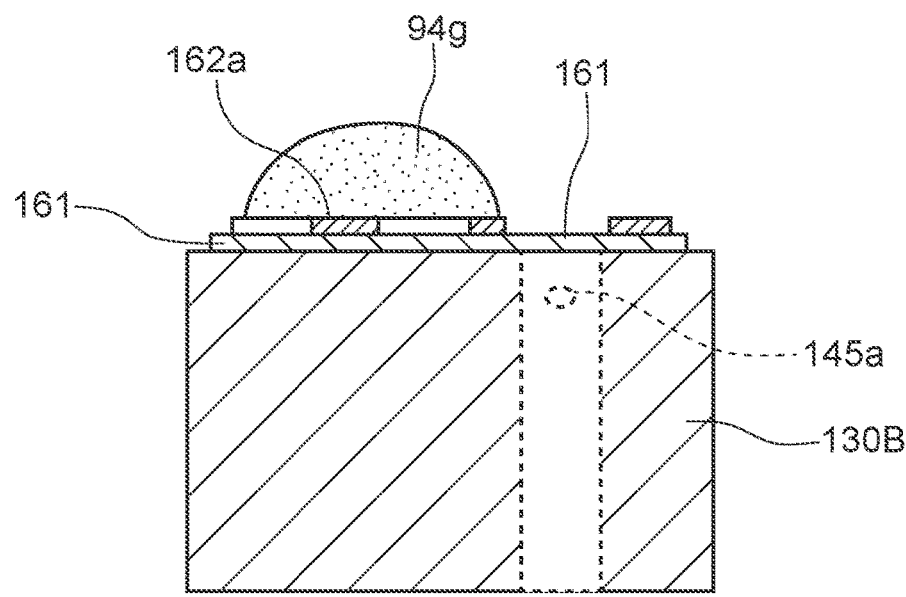
FIG. 29 is a sectional view, taken along the line 29-29 in FIG. 26.

Further, as the laser diode 130B, illustrated in FIG. 26, FIG. 29, when the second metal layer 162 is formed on the first metal layer 161, the strip like extending part 162a is formed on the strip like extending part 161a. However, the first metal layer 161, not the metal layer with small wettability material, is arranged in the surrounding of the strip like extending part 162a. The first metal layer 161 is formed with large wettability material. Therefore, when the connecting ball 94 touches with the strip like extending part 162a, the connecting ball 94 easily spreads over the first metal layer 161 (preventing part expected zone 131e), which is arranged the outside of the strip like extending part 162a. As the result, a solder part 94g, which touches with both the first metal layer 161 and the second metal layer 162, is formed. Therefore, in case of the structure, which the solder-contact preventing part 163 is not included, the solder part 94g is likely to spread over the junction-line 133, the solder part 94g is likely to spread over the side surface of the laser diode 130.

Figure 27:
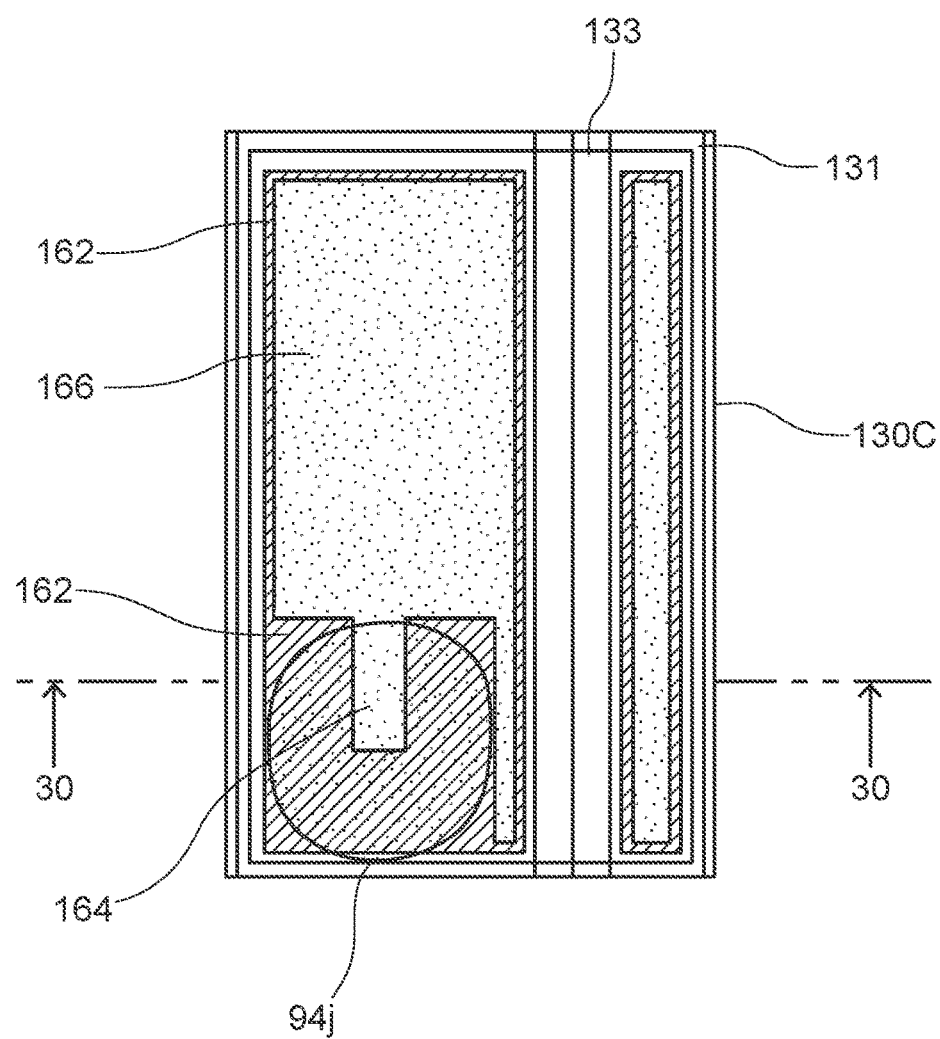
FIG. 27 is a plan view, similar with FIG. 7, showing the laser diode when the first, second, third metal layers are formed on the outer surface and the end part of the solder part.
Figure 30:
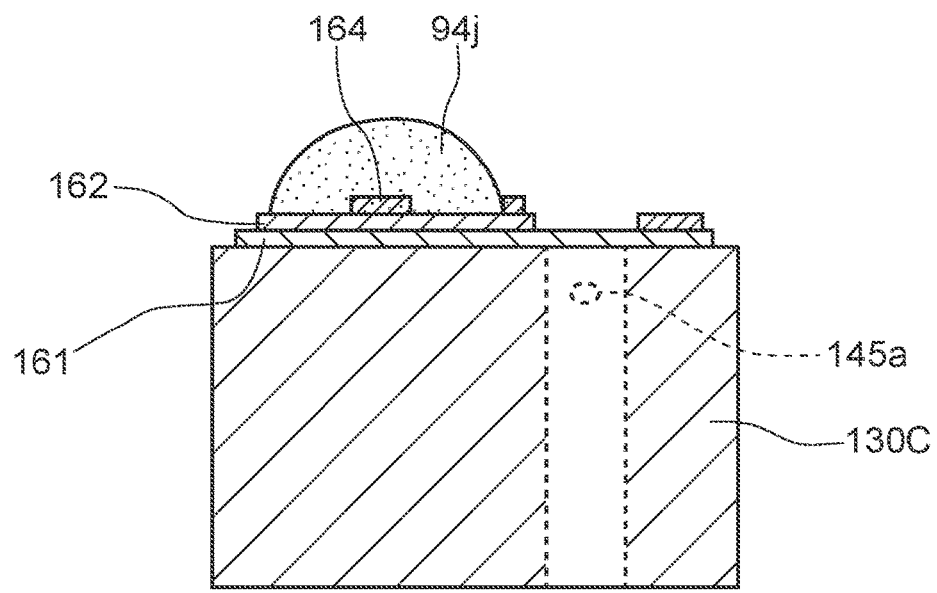
FIG. 30 is a sectional view, taken along the line 30-30 in FIG. 27.

Further, as the laser diode 130C, illustrated in FIG. 27, FIG. 30, when the third metal layer 166 is formed on the second metal layer 162, the solder-bonding pad part 164 is formed with the third metal layer 166 on the strip like extending part 161a.

However, the second metal layer 162 is arranged, but the solder-contact preventing part 163 is not formed in the surrounding of the solder-bonding pad part 164. Therefore, when the connecting ball 94 touches with the solder-bonding pad part 164, the connecting ball 94 easily spreads from the solder-bonding pad part 164 to the second metal layer 162, outside of the solder-bonding pad part 164. As the result, a solder part 94j, which touches with both the second metal layer 162 and the third metal layer 166, is formed. In this case, the solder part 94j is likely to spread over the junction-line 133, the solder part 94j is likely to spread over the side surface of the laser diode 130.

As described-above, it is important that the solder-contact preventing part 163 is formed so that solder is surely connected with the predetermined position of the laser diode 130. As the laser diode 130A, the first metal layer 161 is formed on the outer surface 131 without the solder-contact preventing part 163, when solder wettability of the outer surface 131 (preventing part expected zone 131e) is small, solder is connected with the predetermined position (solder-bonding pad part 164). However, it is preferable that the solder-contact preventing part 163 is formed so that solder is surely connected with the predetermined position of the laser diode 130, as the later-described modified example 1.

Modified Example 1

Figure 23:
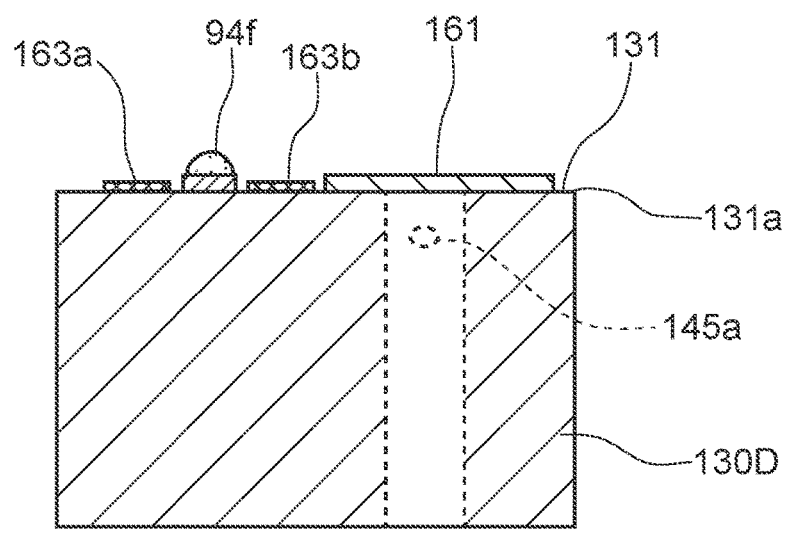
FIG. 23 is a sectional view, taken along the line 23-23 in FIG. 21.

As the above-described laser diode 130A, when the first metal layer 161 is directly formed on the outer surface 131, the strip like extending part 161a is surrounded by the outer surface 131. Then, when solder wettability of the outer surface 131 is lower than the solder wettability of the first metal layer, the end part 94f of the connecting ball 94 remains on the strip like extending part 161a. On this point, as the laser diode 130D, illustrated in FIG. 21, FIG. 23, it is preferable that the solder-contact preventing part 163 is formed in the preventing part expected zone 131e. Thereby, solder is repelled by the solder-contact preventing part 163, similar with laser diode 130. Accordingly, because the end part 94f of the connecting ball 94 surely remains on the strip like extending part 161a, it is possible that solder is surely connected with the predetermined position of the laser diode 130D.

Modified Example 2

Further, as the above-described laser diode 130B, when the first metal layer 161 is arranged in the surrounding of the strip like extending part 162a, the solder part 94g, which touches with both the first metal layer 161 and the second metal layer 162, is formed.

Figure 22:
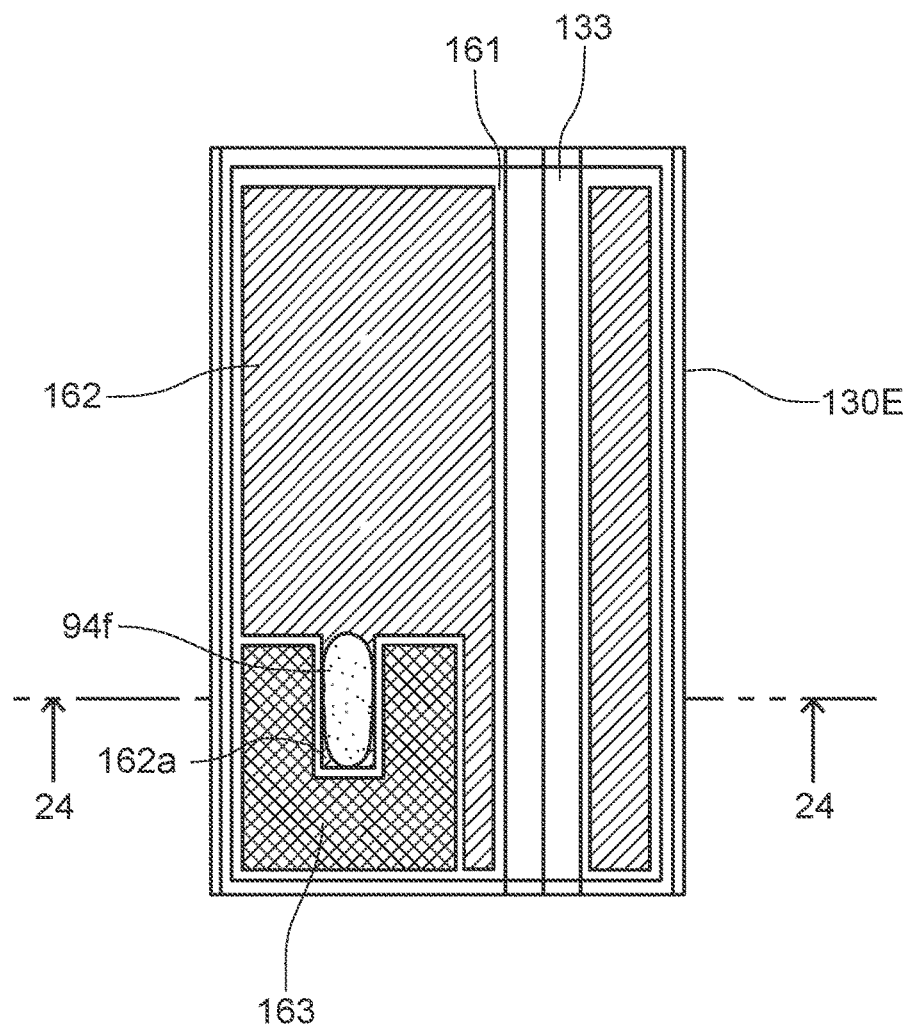
FIG. 22 is a plan view, similar with FIG. 7, showing the laser diode according to a modified example 2.
Figure 24:
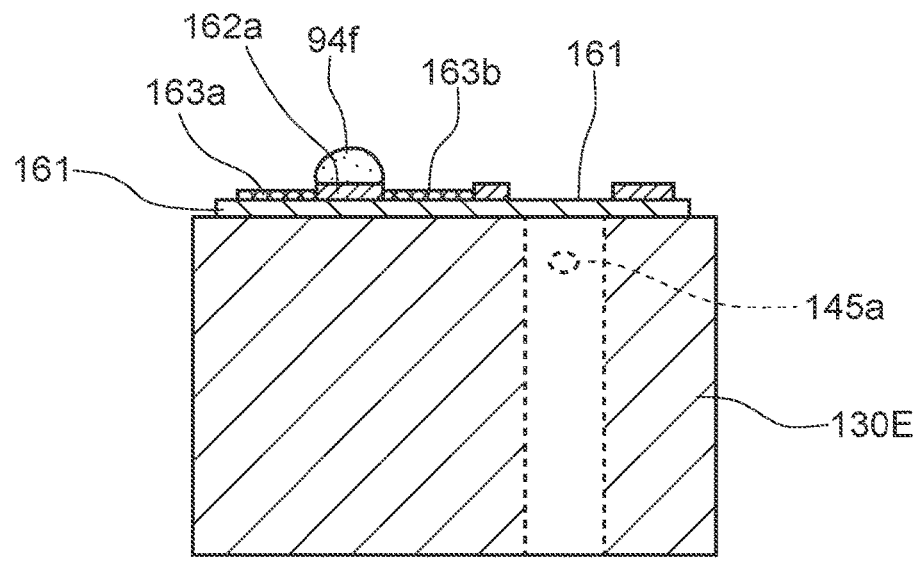
FIG. 24 is a sectional view, taken along the line 24-24 in FIG. 22.

On this point, as the laser diode 130E, illustrated in FIG. 22, FIG. 24, it is preferable that the solder-contact preventing part 163 is formed in the preventing part expected zone 131e. By this, because solder is repelled by the solder-contact preventing part 163, similar with the laser diode 130, the end part 94f of the connecting ball 94 surely remains on the strip like extending part 162a. Therefore, it is possible that solder is surely connected with the predetermined position of the laser diode 130. Further, in case of the above-described laser diode 130D, because the first metal layer 161 is formed directly on the outer surface 131, the strip like extending part 161a is likely to peel off. To the contrary, in case of the laser diode 130E, the strip like extending part 162a is formed on the trip like extending part 161a so as to be laminated. In this case, because both the strip like extending part 162a (solder connecting pad part) and the solder-contact preventing part 163 are formed on the surface of the first metal layer 161, both the strip like extending part 162a (solder connecting pad part) and the solder-contact preventing part 163 are likely not to peel off. The laser diode 130E is preferable on this point.

Modified Example 3

Figure 33:
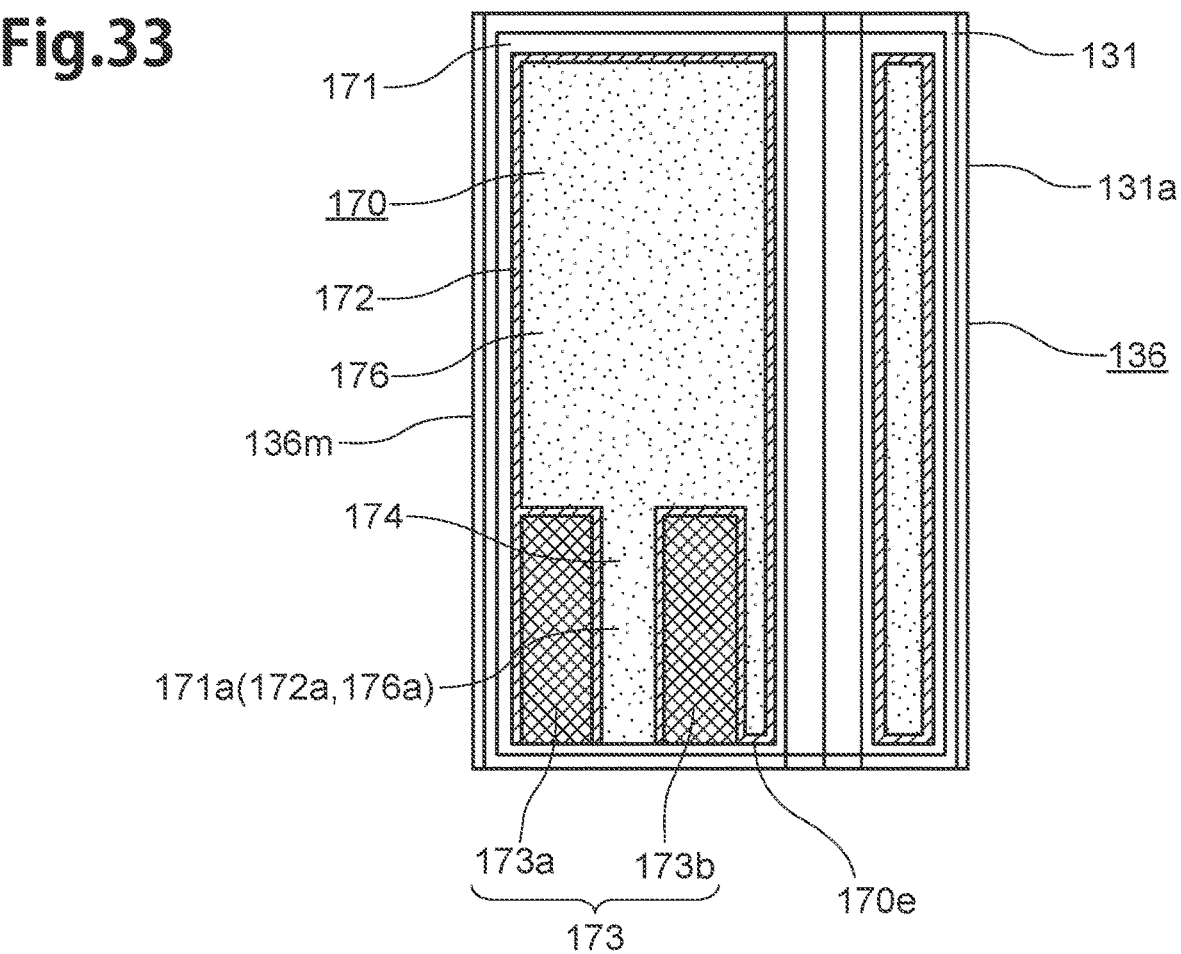
FIG. 33 is a plan view, similar with FIG. 7, showing the laser diode according to a modified example 3.

FIG. 33 is a plan view showing the laser diode 136 according to a modified example 3. The laser diode 136 is different in that it includes an electrode pad layer 170 instead of the electrode pad layer 160, as compared with the laser diode 130.

The electrode pad layer 170 is different in that it includes first, second, third metal layers 171, 172, 176 instead of the first, second, third metal layers 161, 162, 166, and it includes solder-contact preventing part 173, solder-bonding pad part 174 instead of the solder-contact preventing part 163, solder-bonding pad part 164, as compared with the electrode pad layer 160.

The first, second, third metal layers 171, 172, 176 are different in that they respectively include strip like extending part 171a, 172a, 176a, having lengths longer than the lengths of the strip like extending part 161a, 162a, 166a, and the strip like extending part 171a, 172a, 176a respectively include the length capable of reaching an end part 170e.

Because the lengths of the strip like extending part 171a, 172a, 176a are longer than the lengths of the strip like extending part 161a, 162a, 166a, as illustrated in FIG. 33, a length of a solder connecting pad 174 is long. Further, the solder-contact preventing part 173, which includes an outer preventing part 173a and an inner preventing part 173b, being arranged so as to sandwiching the solder connecting pad 174, is formed. Further, a height, from the outer surface 131, of the solder connecting pad 174 (pad height) is larger than a height, from the outer surface 131, of the solder-contact preventing part 173 (preventing height).

In the laser diode 136, the outer preventing part 173a and the inner preventing part 173b are arranged so as to sandwiching the solder connecting pad 174. Therefore, spreading of solder, which is contact with the solder connecting pad 174, is prevented in the left-right direction (a direction toward side surface 136m and a direction toward the junction-line 133). Therefore, solder is surely connected in the predetermined position of the laser diode 136.

Modified Example 4

Figure 34:
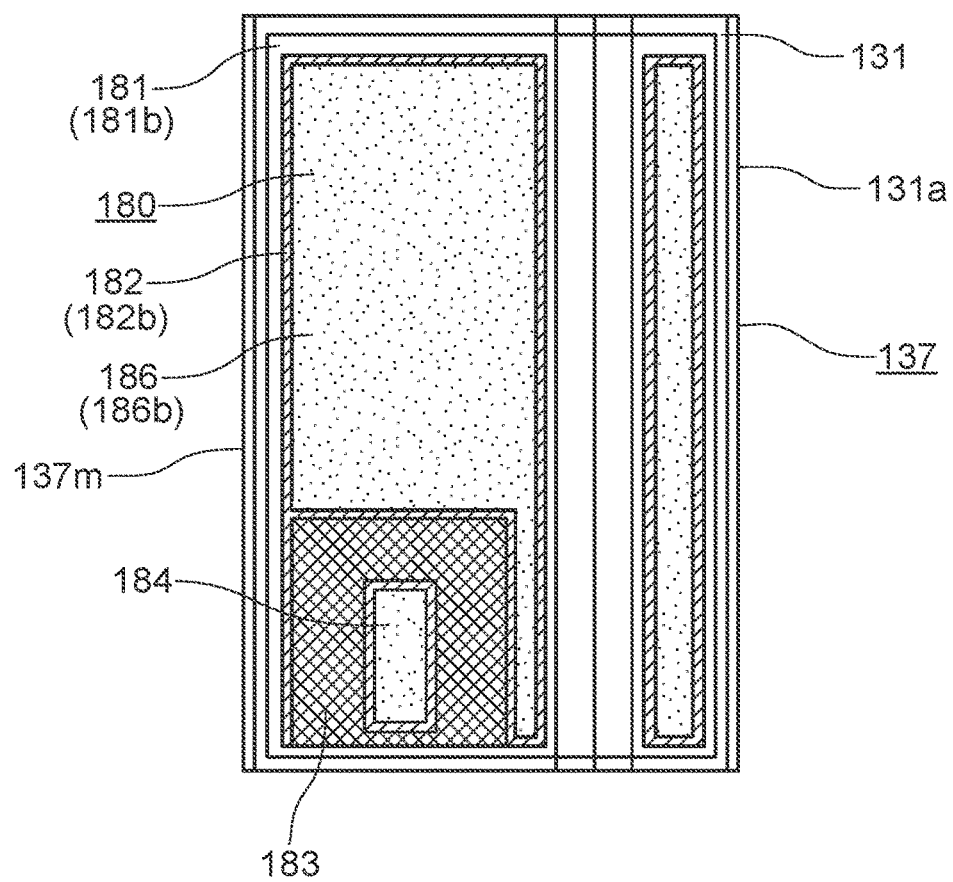
FIG. 34 is a plan view, similar with FIG. 7, showing the laser diode according to a modified example 4.

FIG. 34 is a plan view showing the laser diode 137 according to a modified example 4. The laser diode 137 is different in that it includes an electrode pad layer 180 instead of the electrode pad layer 160, as compared with the laser diode 130.

The electrode pad layer 180 is different in that it includes first, second, third metal layers 181, 182, 186 instead of the first, second, third metal layers 161, 162, 166, and it includes a solder-contact preventing part 183, a solder-bonding pad part 184 instead of the solder-contact preventing part 163, solder-bonding pad part 164, as compared with the electrode pad layer 160.

The first, second, third metal layers 181, 182, 186 are different in that they respectively include island like parts 181a, 182a, 186a instead of the strip like extending part 161a, 162a, 166a, as compared with the first, second, third metal layers 161, 162, 166.

The island like parts 181a, 182a, 186a are formed in positions which are distant from main parts 181b, 182b, 186b of the first, second, third metal layers 181, 182, 186. The solder-bonding pad part 184 is formed with the island like parts 181a, 182a, 186a, and the solder-contact preventing part 183 is formed so as to surround the solder-bonding pad part 184 from four directions.

In the laser diode 137, the solder-contact preventing part 183 is formed so as to surround the solder-bonding pad part 184 from four directions. Therefore, spreading of solder, which is contact with the solder connecting pad 184, is prevented in the four directions. Therefore, solder is surely connected in the predetermined position of the laser diode 137.

In the above-described embodiment, the solder connecting pad 164 has the thickness than the solder-contact preventing part 163 (T2>T1), thereby a structure, which the pad height h2 is larger than the preventing height h1, is obtained. However, it is preferable that a thickness of a metal layer, arranged under the solder connecting pad 164 is larger than a thickness of a metal layer, arranged under the solder-contact preventing part 173.

Embodiments of Hard Disk Drive

Next, embodiments of the hard disk drive will be explained with reference to FIG. 35.

Figure 35:
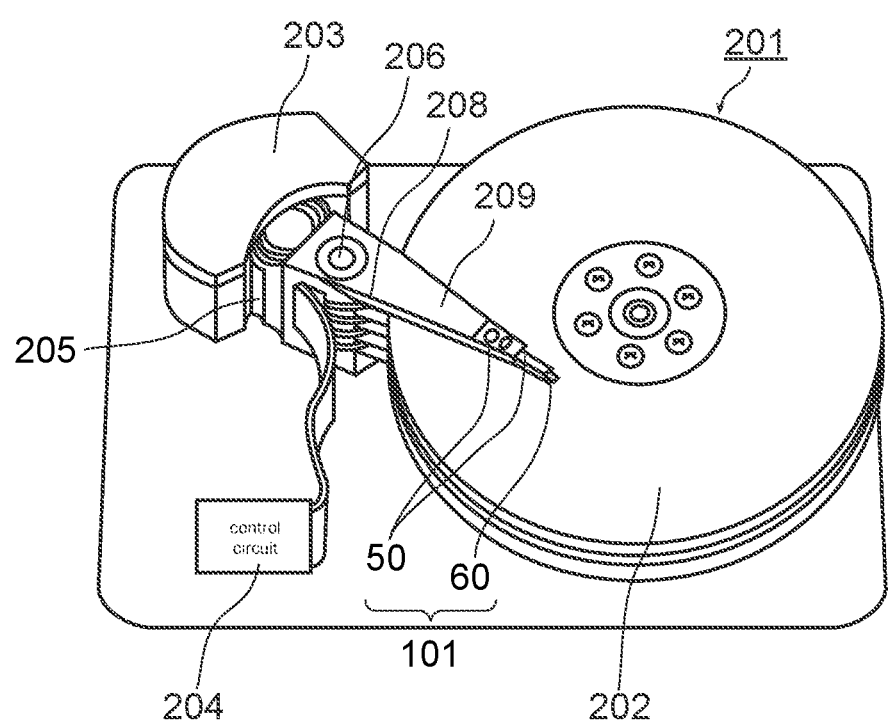
FIG. 35 is a perspective view showing a hard disk drive including the HGA in FIG. 1.
Figure 36:
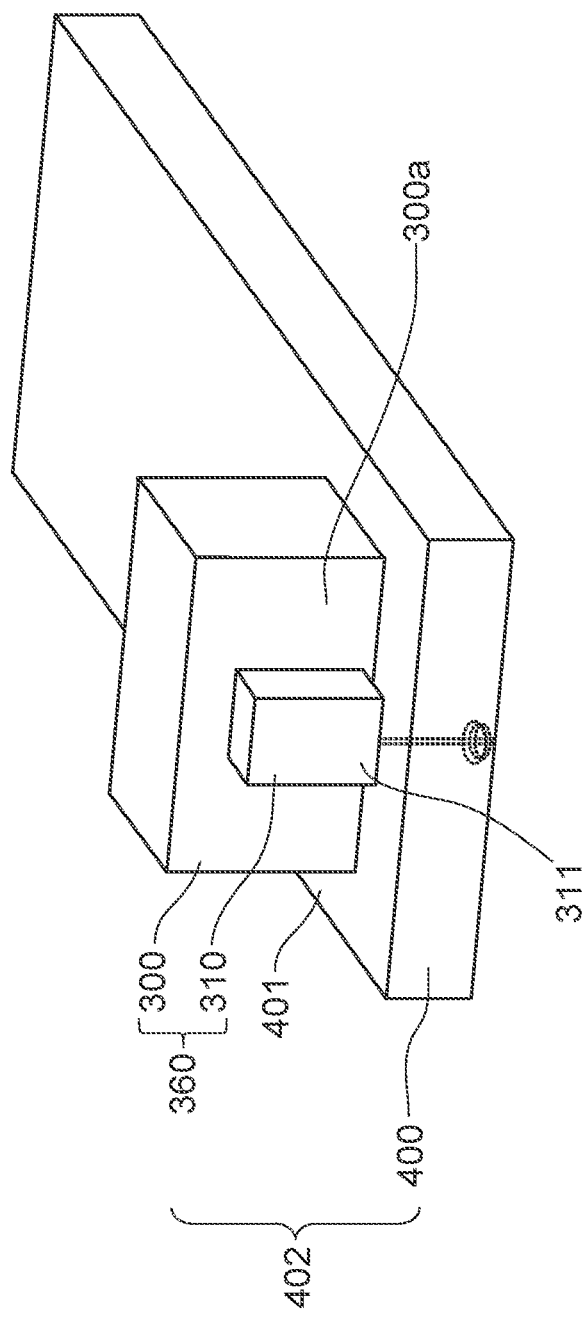
FIG. 36 is a perspective view showing a conventional thermally assisted magnetic head.
Figure 37:
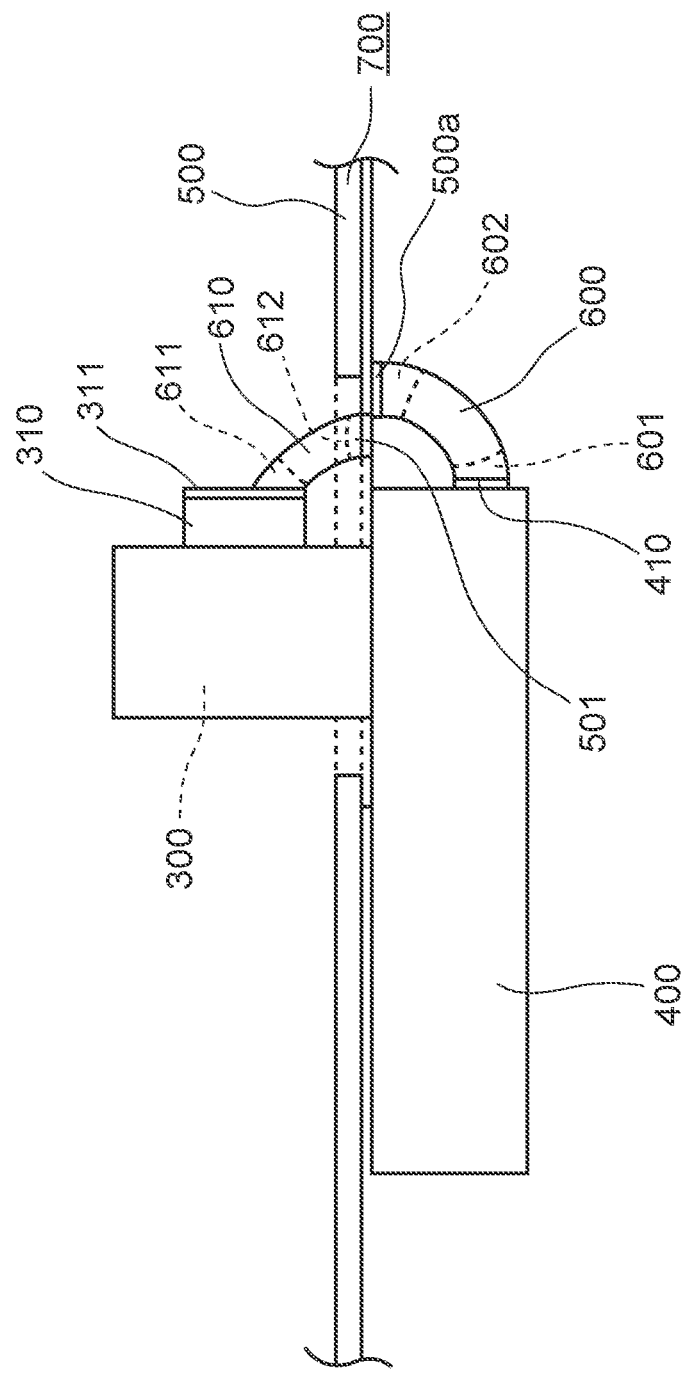
FIG. 37 is a side view, partly omitted, illustrating a principal part of the conventional HGA.
Figure 38:
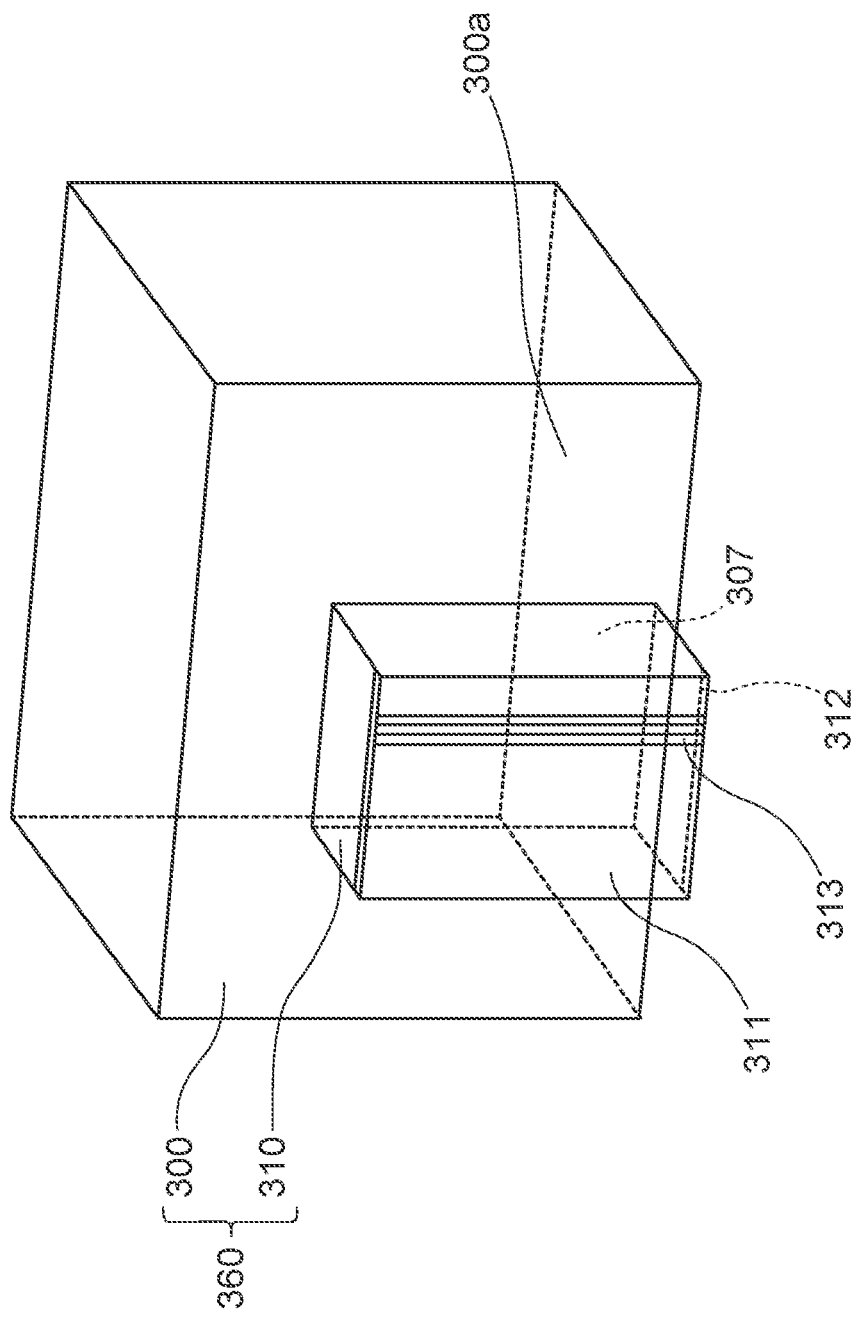
FIG. 38 is a perspective view showing a conventional light source unit.
Figure 39:
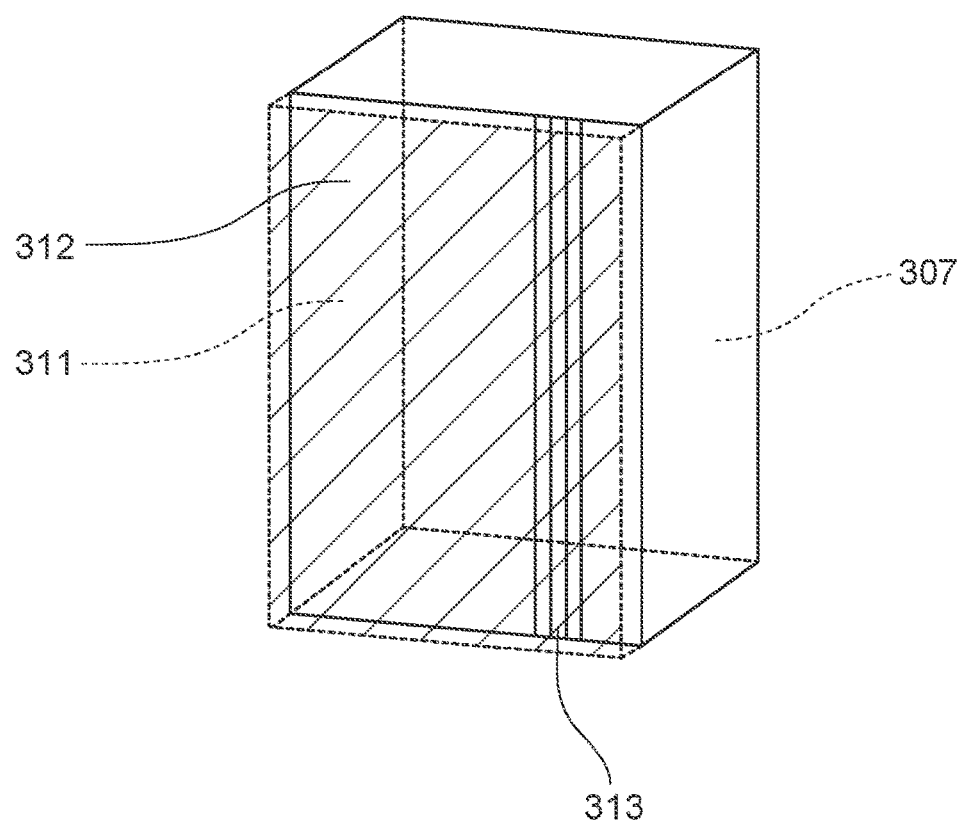
FIG. 39 is a perspective view showing a conventional laser diode.
Figure 40:
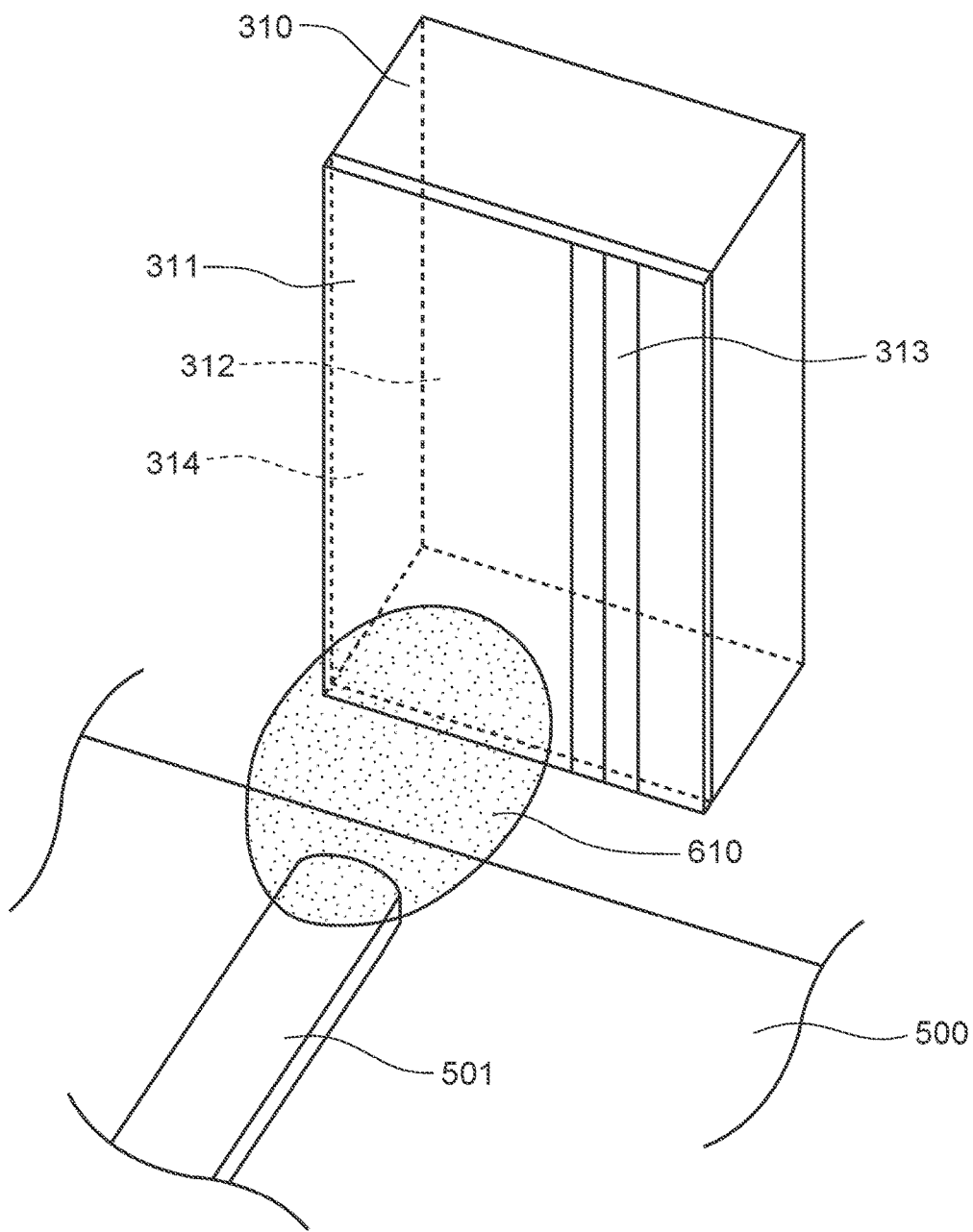
FIG. 40 is a perspective view, partly omitted, illustrating the laser diode and a suspension of the conventional HGA.
Figure 41A:
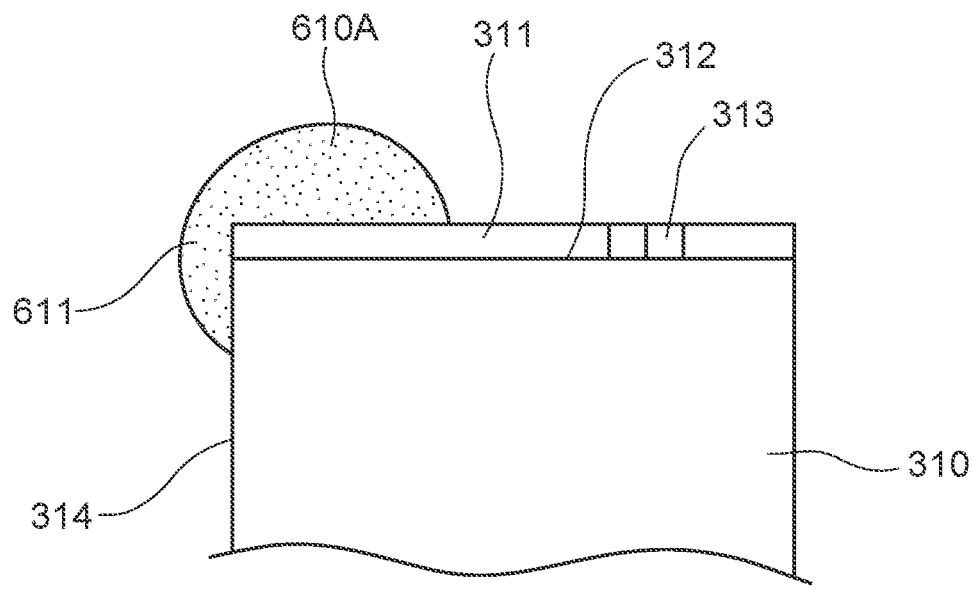
FIG. 41(*a*) is a side view showing the principal part of the conventional laser diode, solder includes an overflow part, flowed over a side surface, FIG. 41(*b*) is a side view showing the conventional laser diode, solder includes the overflow part, flowed over a junction-line.
Figure 41B:
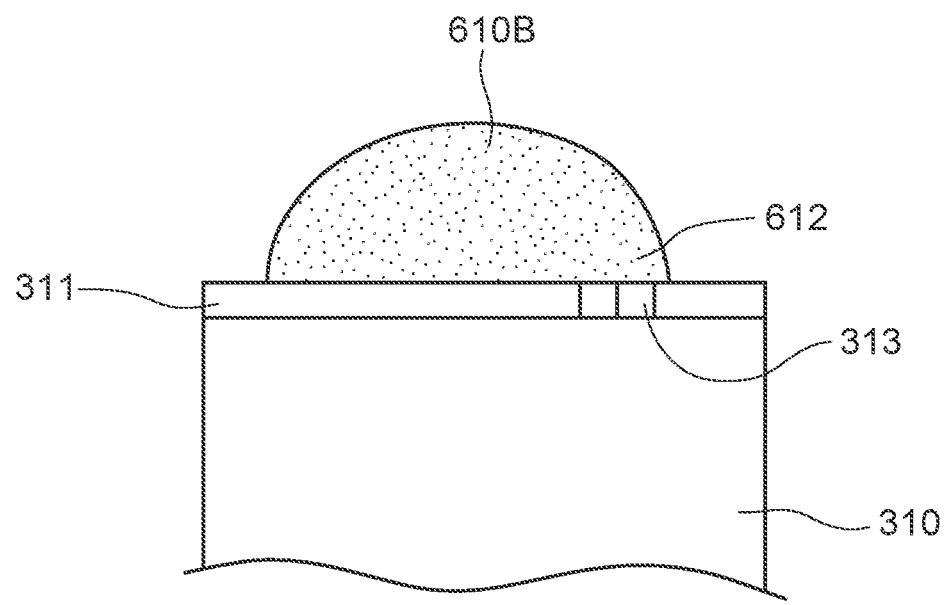
Figure 42A:
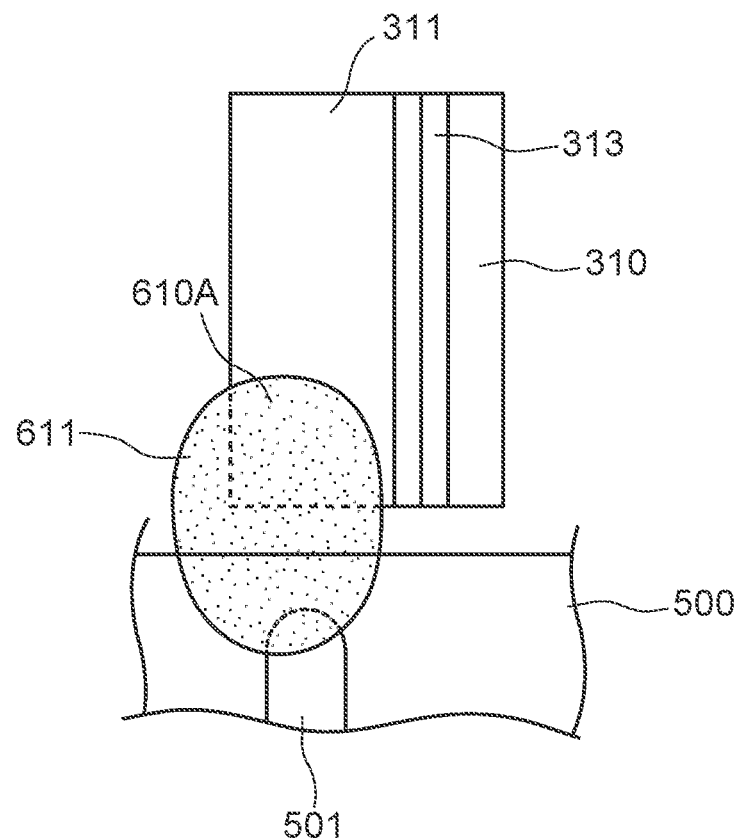
FIG. 42(a) is a plan view showing the principal part of the conventional laser diode and the suspension, solder includes the overflow part, flowed over the side surface.
Figure 42B:
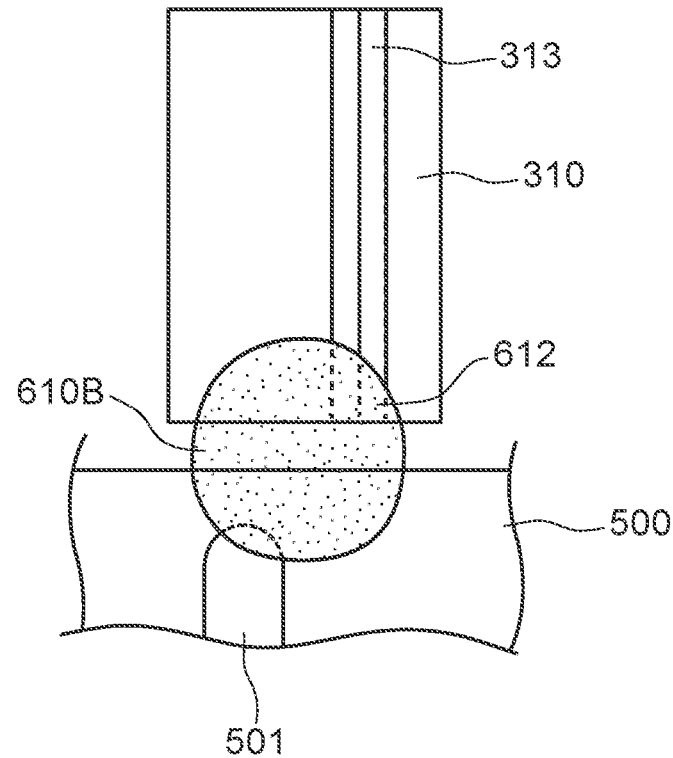
FIG. 42(b) is a plan view showing the conventional laser diode and the suspension, solder includes the overflow part, flowed over the junction-line.

FIG. 35 is a perspective view showing a hard disk drive 201 equipped with the HGA 101 having the above-described thermally assisted magnetic head 60. The hard disk drive 201 includes a hard disk (magnetic recording medium) 202, rotating at a high speed, and the above-described head gimbal assembly (HGA) 101. The hard disk drive 201 is an apparatus which actuates the HGA 101, so as to record/reproduce data onto/from recording surfaces of the hard disk 202. The hard disk 202 has a plurality of (4 in the drawing) platters. Each platter has a recording surface opposing its corresponding the thermally assisted magnetic head 60.

The hard disk drive 201 positions the slider 70 on a track by an assembly carriage device 203. Further, the hard disk drive 201 has a plurality of drive arms 209. The drive arms 209 pivot about a pivot bearing shaft 206 by means of a voice coil motor (VCM) 205, and are stacked in a direction along the pivot bearing shaft 206. Further, the HGA 101 is attached to the tip of each drive arm 209.

Further, the hard disk drive 201 has a control circuit 204 controlling recording/reproducing and the generation of light by the laser diode 130.

In the hard disk drive 201, when the HGA 101 is rotated, the thermally assisted magnetic head 60 moves in a radial direction of the hard disk 202, i.e., a direction traversing track lines.

The hard disk drive 201 have the HGA 101, thereby solder is surely connected in the predetermined position of the laser diode 130, in the HGA 101. Therefore, in the HGA 101, the short circuit, lowering of performance and reliability by solder bonding to the laser diode 130, never occurs, reliability of the hard disk drive 201 is improved.

Though in the above-mentioned embodiments, a type, in which a thin-film coil is wound like a flat spiral about the recording magnetic layer, is explained by way of example, the present invention is also applicable to a type in which the thin-film coil is wound helically about the recording magnetic layer. Further, though in the above-mentioned embodiments, a type, in which the laser diode is used for the thermally assisted magnetic head, is explained by way of example, the present invention is also applicable to a type in which the laser diode is used for the optical device such as the laser radar device.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A laser diode comprising:
    an electrode pad layer, being connected to an electrode; and
    an outer surface in which the electrode pad layer is formed;
    wherein the electrode pad layer comprises a solder-bonding pad part, which is formed inside of a peripheral end part of the outer surface; and a solder-contact preventing part, which is formed between the solder-bonding pad part and the peripheral end part;
    wherein the solder-contact preventing part is formed with small wettability material having solder wettability which is smaller than solder wettability of the solder-bonding pad part;
    wherein the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part.

2. The laser diode according to claim 1,
    wherein the laser diode constitutes a thermally assisted magnetic head with a slider in which an electromagnetic element is formed.

3. The laser diode according to claim 1,
    wherein the solder-contact preventing part comprises an outer preventing part, being formed between the solder-bonding pad part and the peripheral end part; and an inner preventing part, being formed inside of the solder-bonding pad part;
    wherein the outer preventing part and the inner preventing part are formed so that the outer preventing part and the inner preventing part opposes to each other by sandwiching the solder-bonding pad part, and a width and length of the outer preventing part matches a width and length of the inner preventing part.

4. The laser diode according to claim 3,
    wherein the solder-contact preventing part comprises a linking preventing part which connects the outer preventing part and the inner preventing part;
    wherein the linking preventing part is formed between the solder-bonding pad part and the peripheral end part.

5. The laser diode according to claim 4,
wherein the solder-bonding pad part has a thickness which is larger than the thickness of the outer preventing part, the inner preventing part and the linking preventing part.

6. The laser diode according to claim 3,
wherein the outer preventing part and the inner preventing part have widths being equal to or larger than the width of the solder-bonding pad part.

7. The laser diode according to claim 1, further comprising:
a first metal layer which is directly formed on the outer surface;
wherein the first metal layer is formed with large wettability material having solder wettability which is larger than solder wettability of the solder-contact preventing part;
wherein both the solder-bonding pad part and the solder-contact preventing part are formed on the first metal layer.

8. The laser diode according to claim 7, further comprising:
a second metal layer which is formed directly on the surface of the first metal layer; and
a third metal layer which is formed directly on the surface of the second metal layer;
wherein the second metal layer and the third metal layer are formed with large wettability material having solder wettability which is larger than solder wettability of the solder-contact preventing part;
wherein the solder-bonding pad part is formed with a part of the third metal layer, being formed on the second metal layer, and the solder-contact preventing part is formed on the second metal layer, in approximately U-figure shape in a plan view, so as to surround the solder-bonding pad part.

9. A thermally assisted magnetic head, comprising:
a slider in which an electromagnetic element is formed, and
a light-source unit, which is joined to the slider;
wherein the light-source unit comprises a sub-mount, and a laser diode, which is joined to the sub-mount;
wherein the laser diode comprises an electrode pad layer, being connected to an electrode; and an outer surface in which the electrode pad layer is formed;
wherein the electrode pad layer comprises a solder-bonding pad part, which is formed inside of a peripheral end part of the outer surface;
and a solder-contact preventing part, which is formed between the solder-bonding pad part and the peripheral end part;
wherein the solder-contact preventing part is formed with small wettability material having solder wettability which is smaller than solder wettability of the solder-bonding pad part;
wherein the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part.

10. The thermally assisted magnetic head according to claim 9,
wherein the solder-contact preventing part comprises an outer preventing part, being formed between the solder-bonding pad part and the peripheral end part; and an inner preventing part, being formed inside of the solder-bonding pad part;
wherein the outer preventing part and the inner preventing part are formed so that the outer preventing part and the inner preventing part opposes to each other by sandwiching the solder-bonding pad part, and a width and length of the outer preventing part matches a width and length of the inner preventing part.

11. A head gimbal assembly, comprising:
a thermally assisted magnetic head, and a suspension;
wherein the thermally assisted magnetic head comprises a structure which a light-source unit, having a laser diode, is joined to a slider in which an electromagnetic element is formed;
wherein the suspension comprises an opening part which penetrates from a slider arrangement surface, which the slider is arranged, to a light-source unit surface, which the light-source unit is arranged, and a flexure which forms the slider arrangement surface;
wherein the head gimbal assembly comprises an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure;
wherein the laser diode comprises an electrode pad layer, being connected to an electrode; and an outer surface in which the electrode pad layer is formed;
wherein the electrode pad layer comprises a solder-bonding pad part, which is formed inside of a peripheral end part of the outer surface; and a solder-contact preventing part, which is formed between the solder-bonding pad part and the peripheral end part;
wherein the solder-contact preventing part is formed with small wettability material having solder wettability which is smaller than solder wettability of the solder-bonding pad part;
wherein the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part;
wherein the solder connector touches with the solder-bonding pad part without touching with the solder-contact preventing part, thereby the solder connector is connected with the laser diode.

12. The head gimbal assembly according to claim 11, further comprising:
a connection part;
wherein the connection part includes a part, of the solder connector, which is connected to the laser diode;
wherein the connection part remains inside the solder-bonding pad part.

13. The head gimbal assembly according to claim 12,
wherein the solder-contact preventing part comprises an outer preventing part, being formed between the solder-bonding pad part and the peripheral end part; and an inner preventing part, being formed inside of the solder-bonding pad part;
wherein the outer preventing part and the inner preventing part are formed so that the outer preventing part and the inner preventing part opposes to each other by sandwiching the solder-bonding pad part, and a width and length of the outer preventing part matches a width and length of the inner preventing part.

14. The head gimbal assembly according to claim 11,
wherein the suspension comprises a load beam including the light-source unit surface;
wherein the flexure comprises a wiring member which forms the slider arrangement surface;
wherein the wiring member comprises an exposed wiring surface which is exposed in the opening part;
wherein the solder connector is connected to the exposed wiring surface of the wiring member.

15. A hard disk drive comprising:
a head gimbal assembly; and
a magnetic recording medium;
wherein the head gimbal assembly comprises a thermally assisted magnetic head and a suspension;
wherein the thermally assisted magnetic head comprises a structure which a light-source unit, having a laser diode, is joined to a slider in which an electromagnetic element is formed;
wherein the suspension comprises an opening part which penetrates from a slider arrangement surface, which the slider is arranged, to a light-source unit surface, which the light-source unit is arranged, and a flexure which forms the slider arrangement surface;
wherein the head gimbal assembly comprises an assembly structure which the light-source unit is inserted into the opening part from the slider arrangement surface of the suspension and the light-source unit is protruded from the light-source unit surface and the slider is adhered to the slider arrangement surface of the suspension, and a solder connector being formed so that the laser diode is connected to the flexure;
wherein the laser diode comprises an electrode pad layer, being connected to an electrode; and an outer surface in which the electrode pad layer is formed;
wherein the electrode pad layer comprises a solder-bonding pad part, which is formed inside of a peripheral end part of the outer surface;
and a solder-contact preventing part, which is formed between the solder-bonding pad part and the peripheral end part;
wherein the solder-contact preventing part is formed with small wettability material having solder wettability which is smaller than solder wettability of the solder-bonding pad part;
wherein the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part;
wherein the solder connector touches with the solder-bonding pad part without touching with the solder-contact preventing part, thereby the solder connector is connected with the laser diode.

16. A method of manufacturing a head gimbal assembly having a thermally assisted magnetic head and a suspension comprising:
a head connecting step which the thermally assisted magnetic head is connected to the suspension;
wherein the thermally assisted magnetic head comprises a structure which a light-source unit, having a laser diode, is joined to a slider in which an electromagnetic element is formed;
wherein the suspension comprises an opening part which penetrates from a slider arrangement surface, which the slider is arranged, to a light-source unit surface, which the light-source unit is arranged, and a flexure which forms the slider arrangement surface;
wherein the laser diode comprises an electrode pad layer, being connected to an electrode; and an outer surface in which the electrode pad layer is formed;
wherein the electrode pad layer comprises a solder-bonding pad part, which is formed inside of a peripheral end part of the outer surface; and a solder-contact preventing part, which is formed between the solder-bonding pad part and the peripheral end part;
wherein the solder-contact preventing part is formed with small wettability material having solder wettability which is smaller than solder wettability of the solder-bonding pad part;
wherein the solder-bonding pad part and the solder-contact preventing part are formed so that a pad height, being a height from the outer surface to a surface of the solder-bonding pad part, is larger than a preventing height, being a height from the outer surface to a surface of the solder-contact preventing part;
wherein the head connecting step comprises a solder ball arrangement step which a solder ball is arranged so that the laser diode is connected to the flexure, in an assembly structure which the light-source unit is inserted into the opening part from the slider arrangement surface of the suspension and the light-source unit is protruded from the light-source unit surface and the slider is adhered to the slider arrangement surface of the suspension;
wherein the solder ball arrangement step is performed so that the solder ball touches with the solder-bonding pad part without touching with the solder-contact preventing part, thereby the solder ball is connected with the laser diode.

17. The method of manufacturing a head gimbal assembly according to claim 16,
wherein the solder ball arrangement step is performed using a connecting ball in unmelted-solid condition as the solder ball,
wherein the solder ball arrangement step is performed with positioning of the connecting ball so that a part of the connecting ball touches with the solder-bonding pad part.

* * * * *